United States Patent [19]
Pressnall et al.

[11] Patent Number: 5,491,625
[45] Date of Patent: Feb. 13, 1996

[54] INFORMATION DISPLAY SYSTEM FOR ACTIVELY REDUNDANT COMPUTERIZED PROCESS CONTROL

[75] Inventors: Dana W. Pressnall, Midland; Jeffery T. Polishak, Saginaw; Bradley K. Felix; Michael J. Durisin, both of Midland; Joseph Ellison, Detroit, all of Mich.

[73] Assignee: The Dow Chemical Company, Midland, Mich.

[21] Appl. No.: 173,407

[22] Filed: Dec. 23, 1993

[51] Int. Cl.⁶ .................................................. G05B 15/00
[52] U.S. Cl. ........................... 364/133; 364/187; 364/188
[58] Field of Search ..................... 364/131–136, 364/140, 141, 146, 147, 187–193

[56] References Cited

U.S. PATENT DOCUMENTS

| | | | |
|---|---|---|---|
| 4,500,951 | 2/1985 | Sugimoto et al. | 364/186 |
| 4,562,529 | 12/1985 | Drummond | 364/140 |
| 4,641,269 | 2/1987 | Japenga et al. | 364/146 |
| 5,157,595 | 10/1992 | Lovrenich | 364/136 |
| 5,162,986 | 11/1992 | Graber et al. | 364/146 |
| 5,265,004 | 11/1993 | Schultz et al. | 364/140 |
| 5,301,100 | 4/1994 | Wagner | 364/141 |
| 5,400,246 | 3/1995 | Wilson et al. | 364/146 |

*Primary Examiner*—James P. Trammell
*Attorney, Agent, or Firm*—Harness, Dickey & Pierce

[57] ABSTRACT

In an actively redundant computer system, in which two or more computers simultaneously control a process, live data values representing the actual state of preselected variables are simultaneously displayed along with an alphanumeric representation of a source code statement based on those variables.

29 Claims, 14 Drawing Sheets

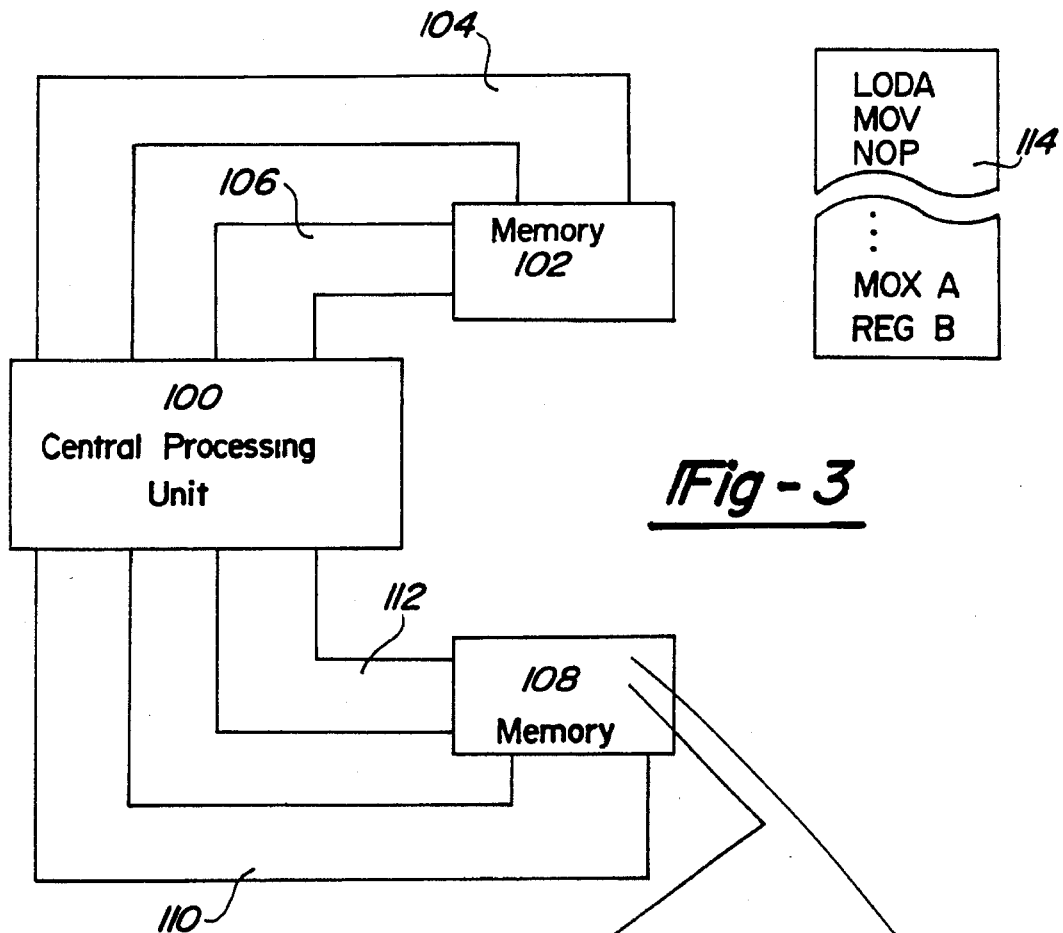
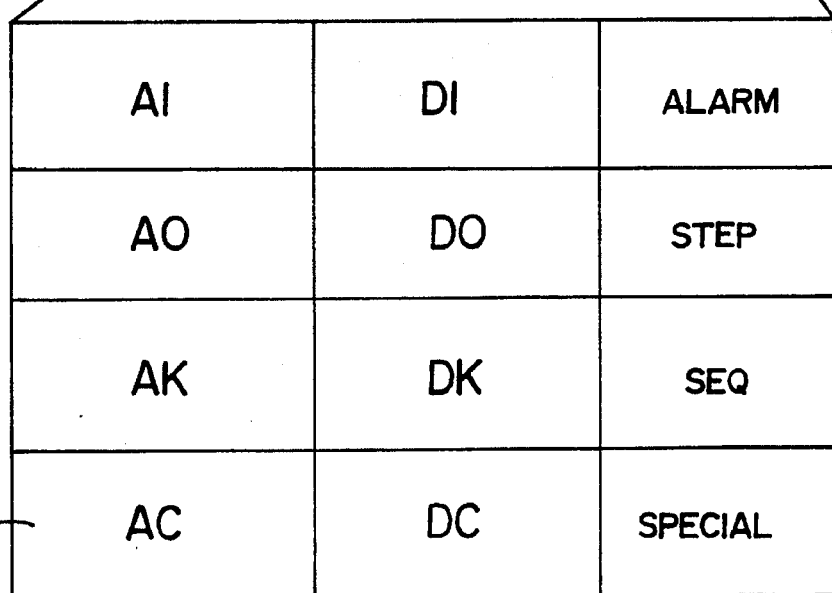
Fig-3

| — | Dynamic Dowtran: MODA | FOX/RIGHT | ○ # |
|---|---|---|---|
| | File  View  Options | | Help |

```
AO(123)       IF [ [ DO(101) ]          XOR    # [ DI(100) ]    =AI(100)+10   100200
F/R 110              TRUE                           TRUE              100

ALT(123)  IF [ [ [ DO(101) ] XOR # [ DI(101) ] ] OR [ DO(102) ] XOR # [ DI(102) ] ]   100201
F/R TRUE              TRUE              TRUE              TRUE              FALSE
```

*Fig-11*

| Dynamic Dowtran : MODA | | FOX/RIGHT |
| --- | --- | --- |
| File View Options | | Help |

```
AO(123)    IF  [DO(101) XOR  #DI(100) ]  = AI(100)=10        100200
F/R 110                TRUE                      100
ALT(123)   IF [[DO(101) XOR  #DI(101) ] OR [DO(102)XOR #DI(102)]] 100201
                       TRUE                   TRUE         FALSE
F/R TRUE
```

*Fig-12*

INFORMATION DISPLAY SYSTEM FOR ACTIVELY REDUNDANT COMPUTERIZED PROCESS CONTROL

BACKGROUND AND SUMMARY OF THE INVENTION

The present invention relates generally to computerized process control systems. More particularly, the invention relates to an information display and diagnostic system for conveying information to an operator about the state of a process being controlled by redundant process control computers.

In controlling complex processes by computer, particularly in mission critical applications, it is very desirable to have redundant computer control. This is certainly true, for example, in automated chemical processing plants, where two or more computers may be connected redundantly to ensure that the process steps are properly carried out and to minimize the necessity for a system shutdown in the event of a component malfunction.

In the case of a chemical processing plant there are typically a very large number of sensors, mixers, valves and other analog and digital components that are needed in order to carry out the process. It can be very expensive to shut down and restart a chemical process, hence many process control systems are designed to operate 24 hours a day, seven days a week. In such systems it is often desirable to employ redundant process control computers, to make the system more fault tolerant. Applicants' assignee, The Dow Chemical Company, has found that redundancy is perhaps best implemented by using two or more process control computers, each running separate instruction code and in which the computers are timed by loosely synchronized, separate clocks. The Applicants' assignee has also found that it can be beneficial to connect these process control computers in an actively redundant fashion, whereby each computer performs its own sequence of program instructions and each computer provides an output signal for simultaneously driving a common device.

In complex process control applications, such as petrochemical process control applications, where thousands of variables must be monitored and controlled essentially simultaneously, and in essentially real time (without substantial delay), providing useful information to the operator or engineer is by no means a simple task. The difficulty in providing information is particularly acute where redundant systems are employed, since it can often be difficult to identify the source of an error or malfunction, particularly where the error or malfunction is intermittent. It would therefore be desirable to have a process control system and a display system which a control engineer or control system operator could use to quickly locate a defective or malfunctioning part or software element in the event the redundant process control computers disagree.

Troubleshooting component failures aside, another difficulty encountered in redundant systems is the problem of how to change or upgrade system software or process control programs without shutting the system down. In a nonredundant system it is typically necessary to shut down the system in order to install a new software upgrade. In a large chemical processing plant this can be very expensive, since components may cool down, processes may begin to react incorrectly, component cleaning may be required, and so forth.

Where a redundant control computer system is employed, the redundancy would appear to provide a unique opportunity for software upgrade without shutting the system down. In some cases this can be done by shutting down only one of the redundant computer systems, leaving the remaining systems operative and running the existing software. The new software revision is then loaded and run on the computer previously shut down, and with great care, the new version is brought on line in an effort to transfer operation of the process from the old software version to the new software version.

While workable in theory, in practice it is often exceedingly difficult to switch over from the old version to the new version, since it must be ensured that both versions are in lock step synchronization. In a complex chemical processing application this might mean that several thousand controllers and valves are in exactly the same state under the old software version as they will be under the new software version at the instant of switchover. In many complex chemical processing applications it is difficult for a human to comprehend this much data using currently existing technology.

SUMMARY OF THE INVENTION

The present invention provides a process control software system and control environment for use by a control engineer or control system operator in the programming and monitoring computer-controlled processes. In one aspect the invention provides a process control display system that provides quickly comprehended information about the state of a redundant process control system. The display system simultaneously provides time aligned, real time data values corresponding to each of a plurality of redundant process control computers. In this way, otherwise difficult to locate intermittent errors and component failures become readily apparent to the engineer at a glance.

The same display system also becomes an indispensable tool in effecting software changes and upgrades, by simultaneously displaying time aligned real time values of the actual data extant in each of the redundant computers (with the outputs from one of the systems being repressed). The real time data is displayed adjacent to each variable of a given process control program source code statement. The control engineer can quickly and easily select the source code statement to be viewed. In this way, the control engineer can readily determine, on a program statement-by-statement basis, or line-by-line basis, that each output variable (e.g., for controlling a valve) has precisely the same value for each of the redundant computers, before switching a new version on line.

Therefore, in accordance with one aspect of the invention, a computerized process control display system is provided for displaying information to an operator about the state of a process under control. The system includes first and second independently operating redundant process control computers, each having an interface mechanism for connection to a common point within the process under control and for monitoring a common parameter associated with the common point. The system further includes first and second process control programs running on the first and second computers, respectively. The process control programs each have the means for controlling the behavior of at least a portion of the process under control. The control program is characterized in that it is capable of representation as a series of source statements, wherein the source statements include at least one token to represent the common parameter. The system further includes a display computer coupled to the first and second process control computers for displaying at least a portion of the series of source code statements which comprise the control program. The system further comprises a data acquisition and display means for obtaining a time aligned common parameter value from both first and second process control computers and for displaying these values adjacent the common parameters token in the source code statement. In this way, the operator is provided with a means for simultaneously visually comparing the monitored parameter from the first and second process control computers.

According to another aspect of the invention the process control display system uses at least one textually represented program statement to represent at least a portion of the process control strategy being used to control the process. The program statement comprises a plurality of tokens or lexical units including one L-value token and at least one R-value token separated by an equivalency token. The system automatically obtains data from the process being controlled and uses that data to assign an actual Boolean state (TRUE or FALSE) to any Boolean R-value tokens and to assign actual analog values to any analog R-value tokens which affect the respective L-value token in the statement. The system also automatically obtains data from the process being controlled and uses that data to assign an actual Boolean state (TRUE or FALSE) to the Boolean L-Value token or to assign an actual analog value to an analog L-value token. The system provides a textual representation of all possible states of the Boolean portions of the R-values that affect the L-value token. In this way information about the state of the process control strategy is conveyed to the operator. Alternatively, the system can display the textually represented program statement using a first visually distinguishable display attribute to depict tokens which are currently TRUE and using a second visually distinguishable display attribute to depict tokens which are currently FALSE. In this way information about the state of the process control strategy is also conveyed to the operator in a readily appreciated form.

In still another aspect the invention provides a process control display system which establishes a main display window and a watch window associated with the main display window. The watch window is preferably capable of displaying textually represented information. A plurality of textually represented program statements are used to represent at least a portion of the process control strategy being used to control the process. A first subset of this plurality of program statements is selected and displayed in the watch window. Thereafter, without changing the first subset selected, a second subset of the plurality of program statements is selected and displayed in the main window. The display of the first subset in the watch window and the second subset in the main window are performed independently so that the selection of the first subset is unchanged by a change or reconfiguration in the selection of the second subset, thereby further providing useful information to the operator.

Additional aspects of the invention include a live data refresh system in which the live data refresh is automatically disabled for windows which have been reduced to an icon or which have been occluded by other windows. Preferably, the incoming data is buffered using a buffer system which automatically rebuilds the buffer upon reselection of a textually represented program statement or upon scrolling of the main display window. In addition, the present system supports both analog and digital display formats.

For a more complete understanding of the invention, its objects and advantages, reference may be had to the following specification and to the accompanying drawings.

BRIEF DESCRIPTION OF THE DRAWINGS

FIG. 3 is a block diagram depicting the Harvard architecture of a process control computer in accordance with the present invention, illustrating the instruction memory and the data memory which is preconfigured to accommodate all predefined data types;

FIGS. 11 and 12 depicts the self-evaluation system of the present invention;

DESCRIPTION OF THE PREFERRED EMBODIMENT

In order to more fully appreciate the challenge presented, some knowledge about the architecture of a reasonably complex computer-controlled process may be helpful. Accordingly, the following will present a brief description of a computerized process control system architecture of the type which might be used in controlling a chemical manufacturing process. Thereafter, the present invention will be described in conjunction with and in the context of a computerized process control system for a chemical manufacturing plant. Of course, it will be understood that the principles of the invention are by no means limited to chemical manufacturing plants and that the description of the presently preferred embodiment of the invention in this context is intended simply to illustrate how to practice the invention and not to limit the scope of the invention as set forth in the claims.

Figure 1:
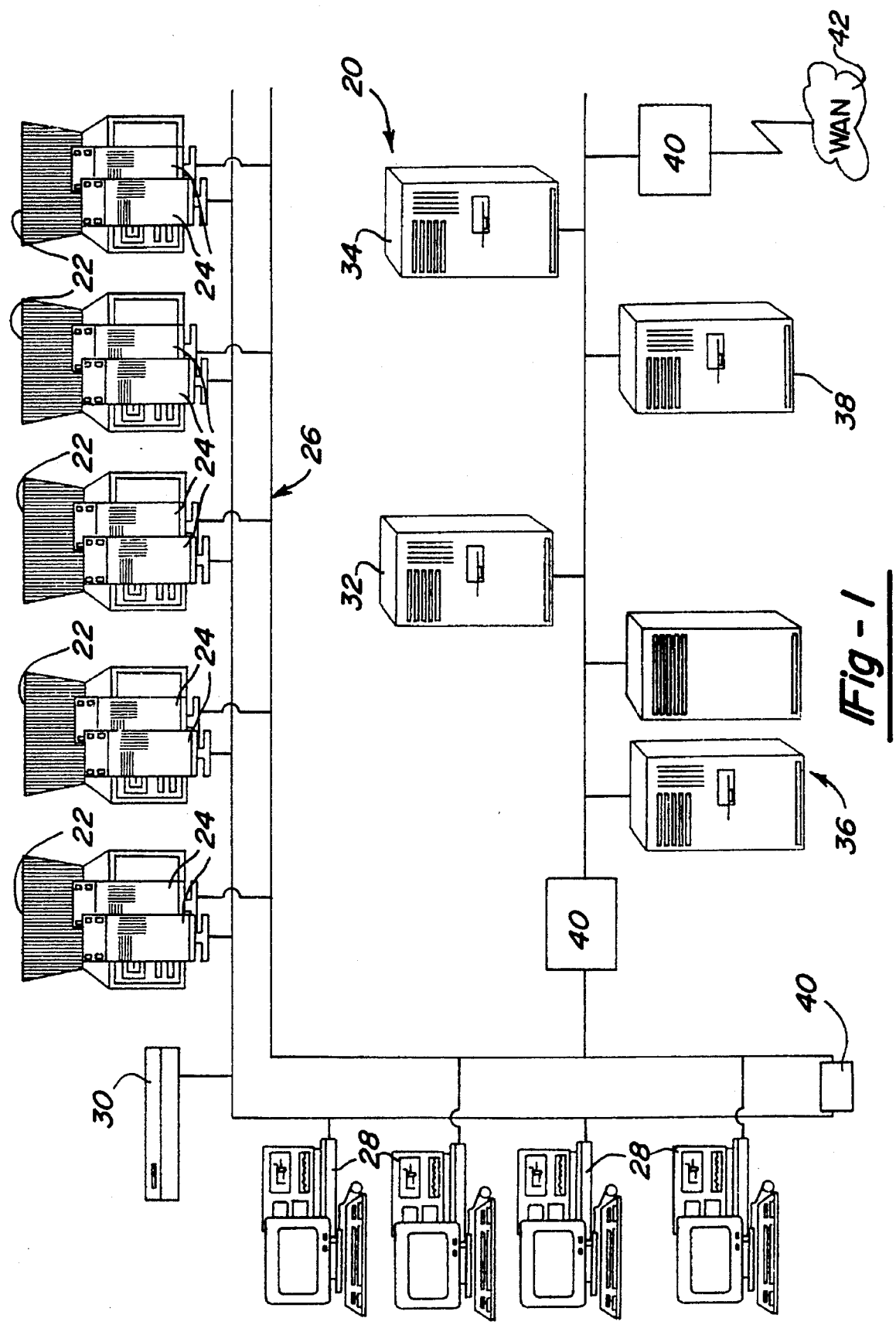
FIG. 1 depicts an exemplary process control computer system, including a plurality of process control computers configured in redundant pairs and further including a computer network to which the process control computers are attached.

In a chemical manufacturing plant there may be hundreds or thousands of electrically actuated valves, temperature controllers, physical property sensors and the like. These electrical devices may be at widely distributed locations throughout the plant. Accordingly, to facilitate computer control, a computerized plant area network will be used and these electrical devices are connected to the network. To illustrate this, FIG. 1 depicts a plant area network 20 employing a multiplicity of dedicated process control computers 22 which are connected via dedicated communications processors 24 to the transmission line or fiber optic backbone 26 of the plant area network. Also connected to backbone 26 are a multiplicity of operator stations 28 which serve as the interface between the human operator and the mechanized or computer-controlled manufacturing process. For a more complete description of the operator station of the preferred embodiment reference may be had to U.S. patent application Ser. No. 08/128,988 of Van Weele et al., entitled "Operator Station for Manufacturing Process Control System," filed Sep. 29, 1993.

The plant area network may also include a computer connected to the network backbone which serves as security manager 30 to provide facilities for network security. For example, the security manager computer may maintain a security table for specifying which of the other systems on the network a given system can communicate with. The plant area network may also include a control room data manager 32 for ensuring that all members of the network have identical copies of all required files, and a process information system 34 for managing historical databases of process information and generally summarizing other information regarding the overall process control system. The historical databasese may optionally be stored on a history server 36. In addition to the history server, the plant area network may also include a support services computer for supplying software used to develop and load executable program code into the process control computers 22. The plant area network, in many commercial applications, can be quite large. In practice, the backbone may be extended by one or more bridges to expand connectivity and to connect portions of the network which may be located in physically separate areas of the plant. Accordingly, in FIG. 1 several bridges 40 are depicted. If desired, a bridge can be used to connect the plant are network 20 to a wide area network, such as WAN 42.

The dedicated process control computers 22 are connected through interface circuitry to the electrical and electromechanical devices and sensors which control the physical process under control. In FIG. 1 the process control computers are grouped into pairs, in which each pair represents a redundant system. That is, each pair the computers are capable of driving the identical process. In the presently preferred embodiment the computers are actively redundant, that is each actively responds to the same sensors and each actively drives the same outputs.

Figure 2:
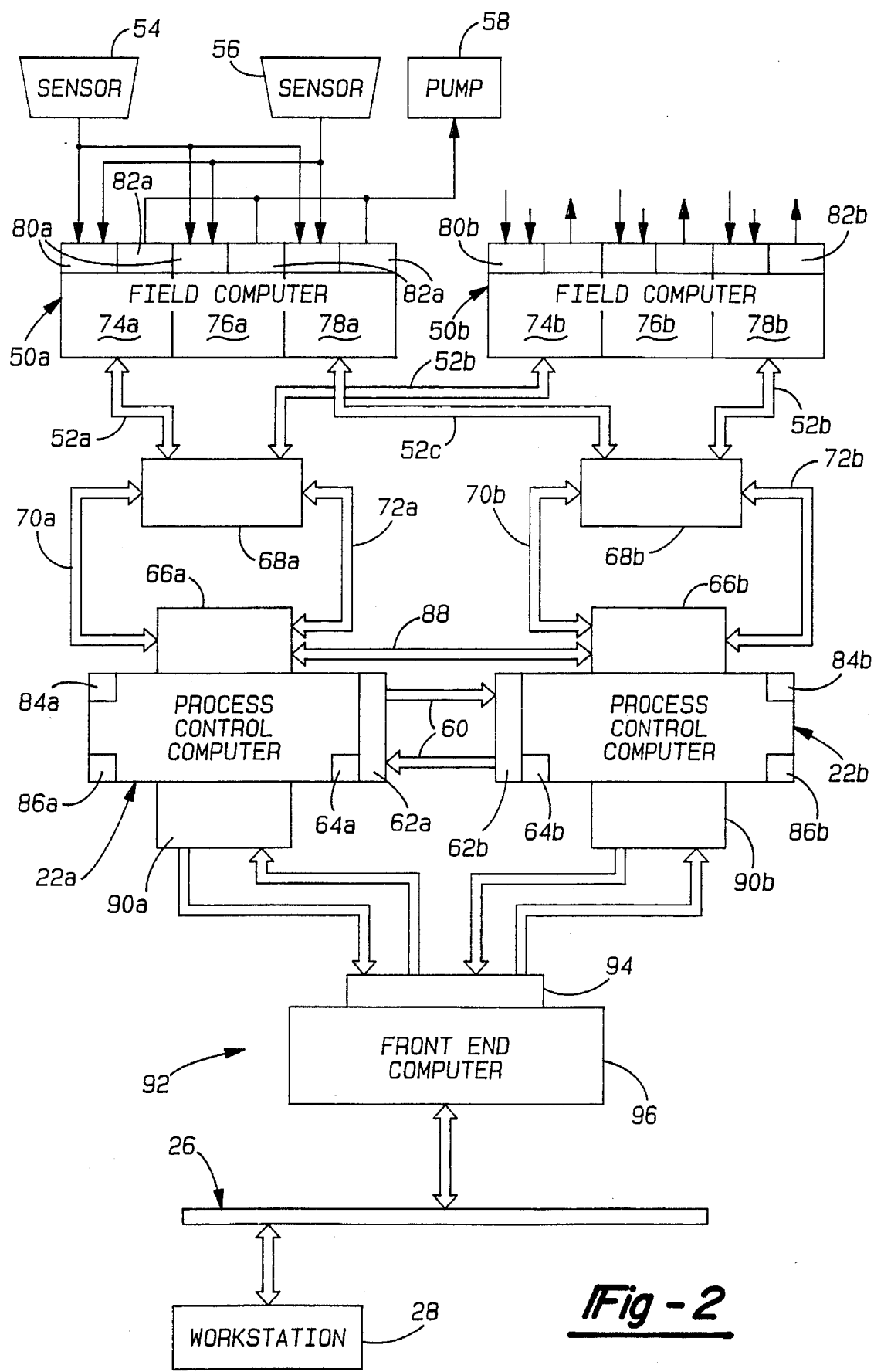
FIG. 2 is a block diagram of the presently preferred arrangement for interconnection and arbitration between a pair of process control computers.

Referring to FIG. 2, a presently preferred arrangement for handling the interconnection and arbitration between a pair of process control computers is illustrated. In FIG. 2, a pair of actively redundant process control computers 22a and 22b are depicted. These computers preferably receive common input data from one or more field computer units, such as field computer units 50a–50b. These field computer units may be located remotely from the process control computers 22a–22b by suitable data communication link, such as fiber optic cables 52a–52d. In this regard, the Glaser et al. U.S. patent application Ser. No. 07/864,931, filed Mar. 31, 1991, entitled "Process Control Interface System Having Triply Redundant Remote Field Units" U.S. Pat. No. 5,428,769 and the Baca, Jr., et al. U.S. patent application Ser. No. 07/925,089, filed Aug. 4, 1992, entitled "Method of Input Signal Resolution for Actively Redundant Process Control Computers" describe in detail the communication and control links between a pair of actively redundant process control computers, such as process control computers 22a–22b, and the input/output devices directly associated with the physical process being controlled. Alternatively, local field instrumentation may be used to more directly connect the process control computers 22a–22b with the input sensors, such as the flow rate sensor 54 and the temperature sensor 56.

While the redundancy of two actively operating process control computers has certain fault tolerance advantages over a single decision making process control computer, the present invention is not limited to a configuration of only two actively redundant process control computers. Thus, for example, it may be desirable to employ three process control computers in the place of the two illustrated in FIG. 2 under appropriate circumstances.

In the present embodiment, the process control computers 22a–22b preferably operate concurrently on all of the signals transmitted from one or more field computer units. In other words, each of the process control computers is capable of making independent decisions based on the data received by the redundant computers from the field. The decisions made by the process control computers 22a–22b determine the output signal values which are ultimately directed to specific output devices (e.g., valves, pump motors, reactor heaters and the like) by the appropriate field computer units. In this regard, a pump 58 is shown in FIG. 2 to illustrate one type of output device that may be controlled by the system.

While the output signal values could be reconciled between the two actively redundant process control computers 22a–22b, in the alternative, two independent sets of output signal values could otherwise be communicated to the field computer units 50a–50b. The input values received from a field computer unit could be arbitrated, making it unnecessary to reconcile or arbitrate output values. This would be the case since both of the process control computers would then be working with the same process control program and operating on the same set of arbitrated input values, with the more powerful (e.g. higher voltage) output signal determining the status of the field control element.

To facilitate input signal arbitration or reconciliation, a bidirectional parallel communication link 60 is provided between the process control computers. This communication link is sometimes referred to as the "major" link, as it permits a direct transfer of data and timing signals between the process control computers. Each of the process control computers 22a–22b is provided with a link circuit 62a–62b, respectively. The link circuit controls bidirectional signal communication over major link 60.

Each of the process control computers includes a central processing unit 64a–64b, respectively. In the presently preferred embodiment the process control computers employ a Harvard architecture which includes a physically separate instruction storage mechanism and data storage mechanism, each having their own address and data lines to connect to the central process unit. The Harvard architecture is presently preferred because it permits OP-code instructions and operand data for the instructions to be fetched in the same clock cycle.

Each of the process control computers includes a network controller 66a–66b to facilitate communication with the field computer units 50a–50b. Each network controller is in turn connected to one or more breakout circuits 68a–68b via fiber optic cables 70a–70b and 72a–72b. The breakout circuits direct input signals from the field computer units to the network controllers. Similarly, the breakout circuits direct output signals from the network controllers to the appropriate field computer units. In the case of a large process control system, employing many field computer units, several breakout circuits may be connected in series to form a communication ring around the network controllers. Additionally, a second level of breakout circuits may also be connected to the illustrated breakout circuits in order to further distribute bidirectional signal communication between the process control computers and each of the field computers. The presently preferred network controllers 66a–66b are capable of using either fiber optic cables 70a–70b or 72a–72b to conduct bidirectional communication with the breakout circuits on the communication ring level.

Each of the field computer units 50a–50b may, themselves, be implemented as a redundant system. In the illustrated embodiment of FIG. 2, field computers 50a–50b employ triply redundant systems comprising a left computer circuit 74a–74b, a middle computer circuit 76a–76b and a right computer circuit 78a–78b. Each of the triply redundant computers is provided with an input circuit 80a–80b and an output circuit 82a–82b. These input and output circuits are connected to the sensors and devices being physically monitored and controlled in the plant, such as flow rate sensor 54, temperature sensor 56 and pump 58.

The breakout circuit 68a is preferably connected to both the left computer circuit 74a of field computer unit 50a and to the left computer circuit 74b of the field computer unit 50b. Similarly, the breakout circuit 68b is connected to both the right computer circuit 78a of field computer unit 50a and to the right computer circuit 78b of field computer unit 50b. In this way, process control computer 22a will receive signals from all of the left computer circuits 74a–74b, while process control computer 22b will receive input signals from all of the right computer circuits 78a–78b. Thus, as illustrated, two separate fiber optic communication networks are provided in the preferred embodiment between the process control computers 22a–22b and the field computer units 50a–50b, even though each of the process control computers is coupled to each of the field computer units.

The middle computer circuit 76a–76b of the field computer units 50a–50b do not communicate directly with the process control computers 22a–22b. The middle computer circuits do, however, communicate directly with the left and right computer circuits 74a–74b and 78a–78b, respectively. Additionally, in the event that three process control computers are employed (in place of the two illustrated), the middle computer circuits 76a–76b may be connected via suitable fiber optic link to communicate directly with this third process control computer. As shown in FIG. 2, the middle computer circuits 76a–76b receive all of the corresponding input signals that the left and right computer circuits receive from the various sensors illustrated. Similarly, the middle computer circuits are also connected to each of the output devices to which the left and right computer circuits are connected.

While the process control computers 22a–22b can receive all of their input signals and transmit all of their output signals to and from the field computer units, they may also be provided with input circuits 84a–84b and output circuits 86a–86b. Furthermore, in addition to the major link 60, which bidirectionally couples the process control computers together, an additional link 88 can also be provided for bidirectionally coupling the network controllers 66a–66b together.

Each of the process control computers includes an IFS circuit 90a–90b to facilitate communication with an intelligent front end communication system 92. The intelligent front end communication system provides an intelligent interface between the process control computers and the plantwide or local area network over the transmission line or fiber optic backbone 26. The front end communication system provides a way to rapidly transfer input and/or output data from the process control computers to one or more network entities, such as an operator workstation 28. The IFS circuits 90a–90b may be connected through suitable fiber optic link to an IFQ circuit 94, which in turn is coupled to the front end computer 96.

In the preferred embodiment, the IFS circuit 90a–90b provides an interface to the stealth port of a dual-ported data memory contained in the process control computer. The IFQ circuit 94 provides an interface to the Q-bus of the front end computer 96. The presently preferred embodiment uses a MICROVAX 4200 computer as the front end computer, running the real time ELN operating system available from Digital Equipment Corporation. For a further description of the front end communication system see DeBruijn, U.S. patent application Ser. No. 07/898,923, filed Jun. 12, 1992, entitled "Secure Front End Communication System and Method for Process Control Computers"; Sederlund et al., U.S. patent application Ser. No. 07/897,905, filed Jun. 12, 1992, entitled "Stealth Interface for Process Control Computers"; and Allbery Jr. et al., U.S. patent application Ser. No. 07/898,126, filed Jun. 12, 1992, entitled "Intelligent Process Control Communication System and Method".

Preferred Software Environment

A. Memory Management

As noted above, the process control computers of the presently preferred embodiment use a Harvard architecture in which the program memory and the data memory are separate and distinct addressable entities, each having their own addressing, fetching and storing mechanisms. This has been illustrated in FIG. 3. In FIG. 3 the central processing unit 100 is coupled to the instruction memory 102 via address bus 104 and data bus 106. Similarly, CPU 100 is also coupled to data memory 108 via address bus 110 and data bus 112. Instruction memory 102 contains the executable program instructions which the CPU 100 will fetch and execute during operation. In practice, these program instructions may be written by the control engineer or computer programmer in a higher level language and compiled into the executable code. For purposes of illustrating the concepts, a diagrammatic representation of a series of program instruction statements has been depicted at 114. Depicted in a pseudo-assembly language format, the instruction statements 114 are intended to represent a sequence of program steps which the CPU will execute in seriatim, unless instructed by a program statement to jump to a nonseriatim address. It will of course be understood that the executable instruction statements will vary widely from application to application and are capable of being displayed in a number of different formats including a binary format and a hexadecimal format.

Dual ported data memory 108 is used to store the data values which the CPU processes during execution of the instructions statements 114. Data memory 108 can also be used to store the order in which the instruction statement subroutines stored in instruction memory 102 are to be executed. In contrast to conventional memory allocation techniques, the preferred embodiment uses a predefined set of data types, with each data type being preassigned a certain number of data cell locations or addresses, at a predefined range of addresses. For illustration purposes, this predefined data memory allocation scheme is illustrated as a memory map grid 116. The memory map grid defines a set of predetermined regions each corresponding to a different data type. For illustration purposes, these regions have been designated by the data type abbreviations as follows:

| Data Type | Description |
| --- | --- |
| AI | Analog Input Variable |
| AO | Analog Output Variable |
| AK | Analog Constant (via User Input) |
| AC | Analog Calculated Variable (Calculated by Computer) |
| DI | Digital Input Variable |
| DO | Digital Output Variable |
| DK | Digital Constant (via User Input) |
| DC | Digital Calculated Variable (Calculated by Computer) |
| ALARM | Variable Representing Alert Condition |
| STEP | Place Holder Identifier Used to Subdivide Programs |
| SEQ | Place Holder Variable Used to Control Sequenced Operations |
| SPECIAL | Special Purpose Variables |

A great deal of speed and reliability results from the predefined, closed set of data type members and the assignment of these members to predefined memory locations. In the presently preferred embodiment, all process control programs are restricted to use of only these data types, which by predefinition, are guaranteed to reside at the predefined memory locations. More specifically, for example, the first analog input variable or data cell, designated AI(1) will always reside at the same physical address, from computer to computer. Likewise, the 100th analog input variable or data cell, designated AI(100) will also reside at the same physical address from computer to computer. Knowing the address of these variables in advance means that the process control computer CPU 100 is able to access the variable (to fetch data or store data) without wasting any clock cycles in locating the variable. This is in contrast with conventional memory management techniques which allocate memory for variables on the fly at compile time or at run time, with no guarantee that a given variable will reside at a given physical address. Indeed, in most conventional systems the von Neumann architecture is used, in which data and program instructions are stored in the same memory space.

In the presently preferred embodiment the different predefined data types have predefined uses, as set forth in the Table above. To further illustrate this, refer to FIG. 4 in which a process control computer 22 is diagrammatically depicted. As illustrated, the analog and digital input variables AI and DI, respectively, represent data gathered from the field. The analog data may be in the form of integer values used to represent analog properties such as temperature. The digital data may be in the form of Boolean (TRUE, FALSE) values used to represent logical conditions such as the position of an ON/OFF switch. The preferred system also uses analog and digital output variables, AO and DO, respectively. These are used as control signals to operate analog and digital equipment in the field. For example, an analog output variable may be used to set a temperature controller and a digital output variable may be used to switch a pump motor on and off. Like their counterpart input variables, the analog output variables may be in the form of integer values and the digital output variables in the form of Boolean values. The presently preferred embodiment uses integer values, with scale factors where needed, to represent analog values and conditions. In the alternative, analog values might be expressed as floating point numbers. The preferred embodiment favors integers over floating point numbers to gain speed.

Figure 4:
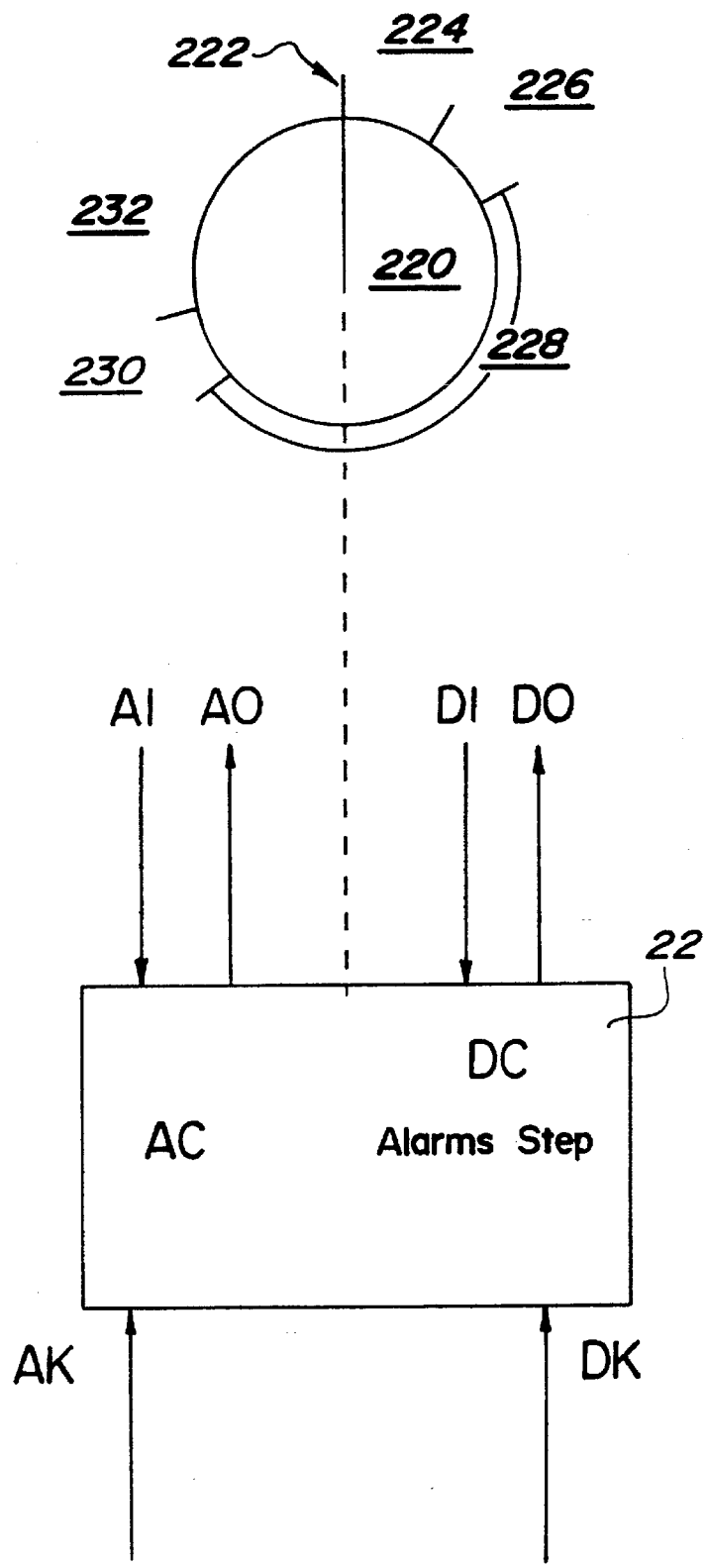
FIG. 4 is an input/output variable and timing diagram showing the presently preferred 1 Hertz cycle.

At times a programmer may wish to use analog and digital constants, to preset initial conditions or to supply parameters which are not expected to change as the process is controlled. The preferred implementation distinguishes between analog and digital constants which the user can enter at the workstation from those analog and digital values which are calculated by the process control computer. In FIG. 4, the user settable analog and digital constants are depicted as AK and DK, respectively. The analog and digital variables which are calculated by the process control computer are depicted as AC and DC, respectively. In addition to these values, the process control computer also uses specialized index counters and flag variables for designating states of operation of the process being controlled.

The presently preferred process control system operates on a fixed clock cycle, presently a 1 Hertz clock cycle, with the constraint that all processing performed by a process control computer must take place within a single cycle. In general, the system is designed so that the cycle time chosen is substantially shorter than the physical reaction time of the system. In other words, the computer system should react more quickly than the physical system being controlled. In process control applications such as chemical plants it has been found that a 1 Hertz cycle is appropriate. In FIG. 4 the 1 Hertz clock is depicted by reference numeral 220. Preferably data input, data output and computer processing events occur at preassigned times within the 1 Hertz cycle. The 1 Hertz clock is broken into time intervals for this purpose.

In FIG. 4 the beginning of the cycle is depicted at 222. In the illustration time advances clockwise. In the first time interval 224 all input variables (AI and DI) are read by accessing the associated devices via the field computer units and are stored as the current values in the preassigned AI and DI memory locations. Following this time interval, the next time interval 226 is reserved for arbitration. It is during the arbitration interval 226 that the process control computer arbitrates with its counterpart or counterparts in the actively redundant system. Arbitration is discussed more fully below. In the next time interval 228 the process control computer runs the set of program instructions written by the system operator or engineer for controlling the physical process. The amount of time required for the entire process control program to execute will vary, depending on the tasks to be performed. In the illustration of FIG. 4 approximately one-half of the 1 Hertz cycle is shown as being used for the process control program itself. It is important to recognize that the process control program is written by the engineer to ensure that all instructions will execute during the 1 Hertz cycle. Preferably, these process control instructions are repeatedly run, fully from start to finish, during time interval 228, for each 1 Hertz cycle.

Following the process control cycle 228 the 1 Hertz cycle includes time interval 230 during which all output variables (AO and DO) are transmitted to the field, as required, based on the results of processing steps performed during time interval 228. The remaining time interval 232, following time interval 230, is referred to as the "Hertz infinity" (Hz∞) interval and takes up the remaining time until the 1 Hertz cycle repeats at 222. The amount of time available for the Hz∞ interval 232 will depend on the amount of time used by the other intervals, and in particular processing interval 228. The Hz∞ 232 can be used for noncritical tasks such as printing, communicating and the like, which are not required for process control.

From the above it will be understood that the process control software system purposefully restricts all process control operations to be performed within a predefined time interval or time window commencing once each second (or once each clock interval). To ensure that the entire process control program is run from start to finish in the allotted time, the presently preferred process control language restricts the programmer from using conditional branch statements. Instead, the state of the process under control is determined and stored using the available digital and analog constants and the ALARM, STEP and SEQ variables. These are then available for interrogation during the processing cycle to aid in decision-making. This will be illustrated more fully below when the presently preferred language is described.

Given the requirement that all processing steps must be performed within a finite, predefined time, it is possible for a program to grow beyond the limits of the process control time segment 228. When this occurs, the process control task is divided into multiple parts and each part is assigned to a separate bank of actively redundant process control computers.

Arbitration

The actively redundant process control computer system architecture relies on an arbitration scheme for handling the case in which the redundant computers arrive at different output data, presumably based on the identical input data. In the present arbitration scheme each of the redundant set of process control computers is assigned one or more logical designations which dictate how the computers respond during arbitration. For convenience, each of the process control computers is assigned a logical "position" name, such as "left," "middle" and "right." (For a three computer redundant system) or "left" and "right" for a two computer redundant system. In addition, each computer is assigned a logical "function" name useful in describing how the respective redundant computers will function in certain types of standoff arbitrations. In the illustrated two computer redundant system of FIG. 2 the Applicants have adopted the logical function names "fox" for computer 22a and "dog" for computer 22b. Of course, these names are for convenience only, as any names will suffice. In addition, computer 22a, for convenience, has also been designated or named "left" and computer 22b designated or named "right." The reason for having both a logical position name (left, right) and a logical function name (fox, dog) is to allow different arbitration schemes to be followed, depending on whether the arbitrated value has a physical manifestation or not. Digital and analog input and output values have a physical manifestation, in that they relate to or map onto physical devices within the process being controlled. On the other hand, a variable such as a STEP is a purely logical entity and has no physical manifestation. The STEP variable is used to break up a process control problem into a number of sequential "steps" which the process control computer performs in sequence. The RECIPE variable is another identifier variable which has no physical manifestation. The RECIPE variable is used to designate or label a given collection of steps and instructions for accomplishing a predetermined processing task. In this regard, the RECIPE for making styrene would be designated differently from the RECIPE for making polyvinyl chloride.

Arbitration is performed, preferably during the arbitration time interval 226, and any discrepancies are resolved based on a predefined priority scheme. Discrepancies regarding variables with a physical manifestation are resolved by the left/right computers and discrepancies in variables having no physical manifestation are resolved by the fox/dog computers. In this regard, it bears repeating that the left/right computers and the fox/dog computers are simply different names for the physical process control computer entities 22a and 22b. Thus, for example, in the illustrated embodiment the designations "fox" and "left" refer to the same physical device, namely computer 22a; similarly the designations "dog" and "right" refer to the physical process control computer 22b. These are simply naming conventions and the roles of fox/dog may be reversed vis-a-vis left/right, so long as the convention adopted is used consistently.

As will be described momentarily, the arbitration event is triggered to occur in a way which ensures that both process control computers have completed reading all input variables. During actual arbitration, any discrepancies in analog input (AI) or digital input (DI) readings are resolved by favoring the reading obtained by the logical left computer. Any discrepancies in the RECIPE variable, the STEP variable or other variables having no physical manifestation are resolved in favor of the logical fox computer. ALARM variables are not arbitrated. Each computer handles ALARM conditions independently and the hardware circuitry is designed to tag all ALARMs to designate which computer of the redundant set generated them.

In a doubly redundant system, during arbitration the right computer checks each of its analog and digital input variables with those of the left computer. The logical left value is used if both left and right agree within 1½% (or some other suitable percentage). If there is no agreement within 1½%, then both left and right computers use their own values and program engineers take this fact into account when writing the process control software. In addition, if there is no agreement, any discrepancies beyond an arbitration flag is set indicating a possible malfunction. In this way, if there is agreement within 1½%, any computations taking place during the processing interval 228 will be based on the same input values for both computers and thereby in all likelihood producing the same output values. Similarly, if during the arbitration interval the STEP variables of the fox and dog do not match, the STEP variable for the fox is used and the dog simply changes its STEP variable to match that of the fox and sets the arbitration flag.

Arbitration of analog and digital output values is handled automatically, on a hardware level. Specifically, during the data output interval 230 both computers will attempt to drive the same output wire. In this case, the circuitry is configured so that the high value always wins. The programming engineer takes this into account when writing process control programs, by configuring the system so that the high signal is associated with the at rest condition or low energy state, where possible.

In the doubly redundant system described above arbitration discrepancies are handled by preassigning one of the two computers to be the victor. In a triply redundant system a number of different arbitration mechanisms are possible. One option is to employ a "bit vote" scheme in which each computer will always lose in arbitration with one neighbor and will always win arbitration with the other neighbor, similar to the "papers, scissors, rocks" childhood game. Another option is to always select the middle computer, for example, in all arbitrations between left, middle and right. Yet another option is to use an average value calculated using each of the three computer values. A fourth option, one that is presently preferred, is to take the leftmost value of the two computers agreeing within 1½% and use that value as truth for all three.

To ensure that each of the redundant computers is finished reading input data before arbitration is commenced, at least one of the redundant computers is started slightly behind the rest and this computer is used to initiate arbitration. In the doubly redundant system the fox computer starts first and the dog computer follows about 2 milliseconds later. Since both fox and dog are responsible for reading the identical analog and digital input variables, starting the dog after the fox ensures that the fox is finished reading all input variables when the dog is finished reading all input variables. This is illustrated in the series of FIGS. 5A–5E, in which the fox is shown on the left as 220a and the dog is shown on the right as 220b. Each of FIGS. 5A–5E designates the beginning of the timing cycle at 222 and each figure shows the fox 220a is slightly ahead of dog 220b. Thus, in FIG. 5A the fox 220a has reached the end of time interval 224 while dog 220b is still in time interval 224. It will be recalled from the description of FIG. 4 that time interval 224 is the interval during which digital and analog input variables are read from the field computers.

Figure 5A:
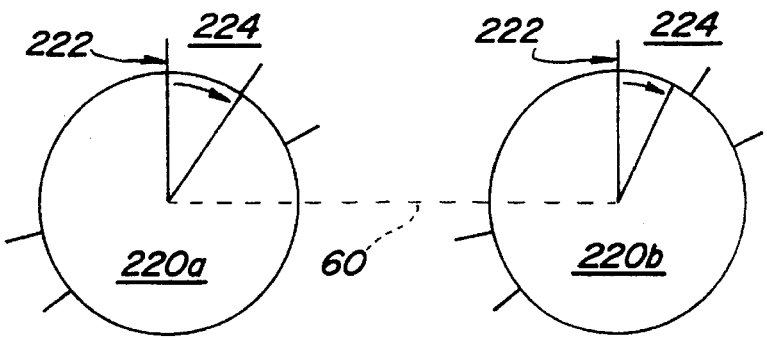
FIGS. 5A–5E (collectively FIG. 5) are a series of timing cycle diagrams showing the timing cycle relationship between a pair of redundant process control computers in accordance with the preferred embodiment.
Figure 5B:
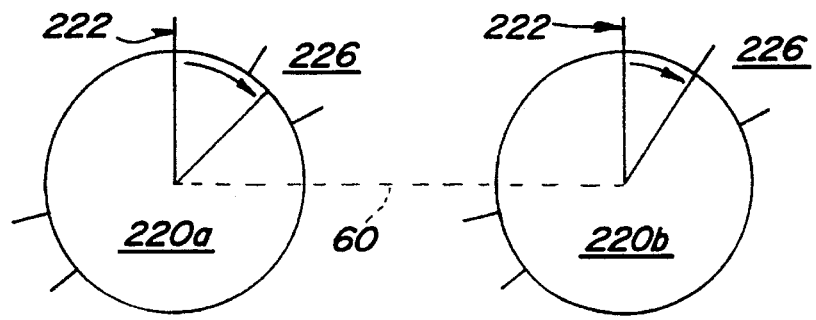
Figure 5C:
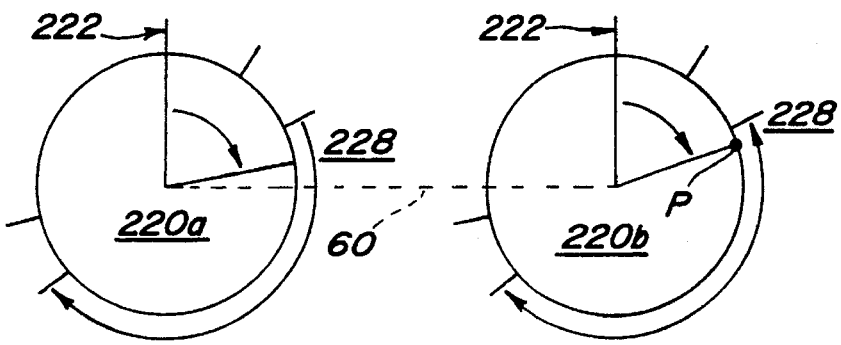

In FIG. 5B dog 220b has arrived at the arbitration interval 226. Fox 220a is already in the arbitration interval. When the dog 220b arrives at the arbitration interval, it initiates the arbitration sequence by notifying fox 220a. Thereafter, each computer compares its values with those of the other or others and then performs the arbitration reconciliation routines discussed above.

Figure 5D:
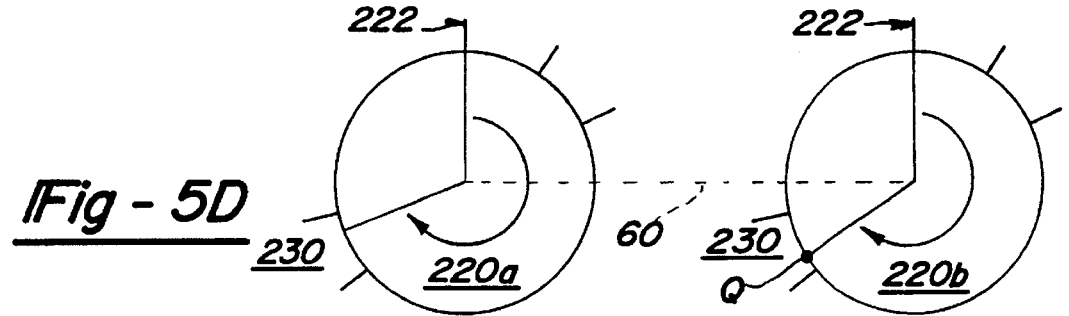
Figure 5E:
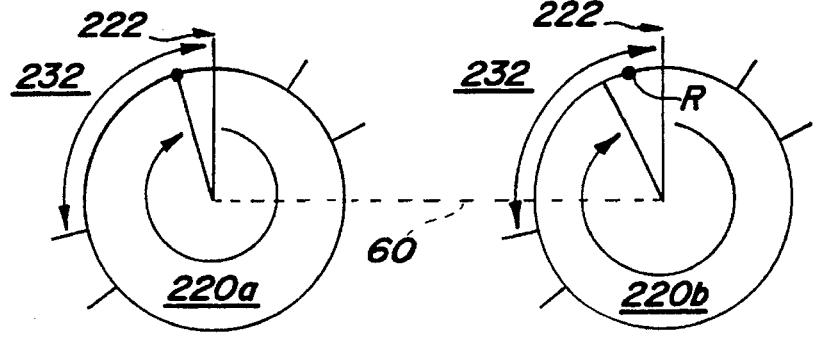

By the time dog 220b crosses the threshold into time interval 228 (shown in FIG. 5C) arbitration is ended and both computers commence processing of all program instruction statements supplied by the process control program stored in the instruction memory 102. Time interval 228 ends when dog 220b enters time interval 230, as illustrated in FIG. 5D. During time interval 230 both computers set all analog and digital output variables by driving the appropriate signal wires attached to the field computer units. Finally, after all analog and digital output variables are updated, time interval 230 ends and both computers enter the Hz∞ interval 232 illustrated in FIG. 5E. The Hz∞ interval ends when the cycle reaches starting point 222, whereupon the next cycle immediately begins.

Simultaneously Monitoring of Time-Aligned Parameters

The present invention is capable of providing a concurrent display of simultaneously monitored, time-aligned parameters. This display is quite useful in troubleshooting redundant process control systems and is also quite useful in making a smooth transition from one software version to another in a redundant computer system. The presently preferred embodiment provides this display in conjunction with an alphanumeric display of a program statement or expression in source code format. This is illustrated in FIG. 6.

The present information display system is thus configured to display, at the operator's request, the actual values of selected variables, simultaneously from each of the redundant computers. For added usefulness, the values are displayed along with a process control program source code statement which uses and/or calculates those variables. Preferably, the actual values of each variable in a selected source code statement are displayed immediately adjacent the display of the source code statement, as illustrated in FIG. 6. In FIG. 6 a display window is illustrated generally at 234. Within the display window is a child window 236 in which a source code statement appears generally at 238. Beneath the source code statement is a display of the actual values obtained by the fox, at line 240 and the dog, at line 242. As illustrated, these values are arranged vertically beneath the corresponding variables of source code statement 238. Thus, in the example illustrated in FIG. 6, analog output variable AO(123) has a value of 100 according to the fox and a value of 100 according to the dog. Similarly, digital output variable DO(101) has a value of TRUE for both fox and dog. From a review of the example illustrated in FIG. 6, one can readily discern that both fox and dog are reporting consistent values for all variables illustrated. This represents a normal operating condition where there are no discrepancies between the redundant systems, as far as the illustrated variables are concerned. In contrast, FIG. 7 illustrates the same source code listing, but with discrepancies between the fox and dog computers. As displayed by the invention, these discrepancies are immediately apparent by simply comparing the actual values reported. Analog L-values having a Boolean R-value or expression associated with them hold their last value until their Boolean R-value or expression becomes TRUE. This is illustrated in comparing FIG. 6 and FIG. 7.

Figure 6:
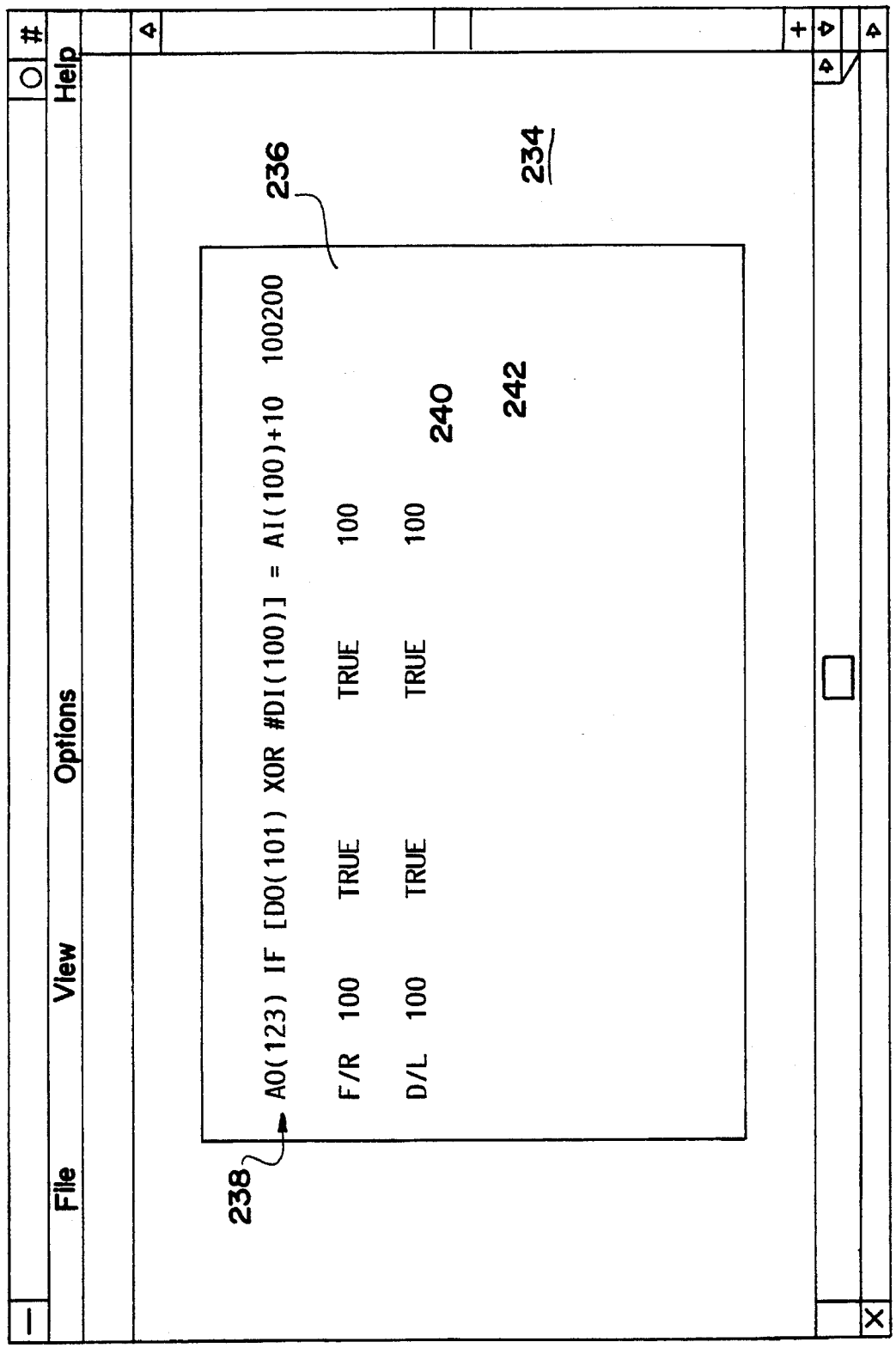
FIG. 6 is a display window of the preferred graphical user interface showing the preferred manner whereby time-aligned real time values are displayed adjacent the source code listing of a program statement, illustrating the case in which both redundant process control computers are in agreement.
Figure 7:
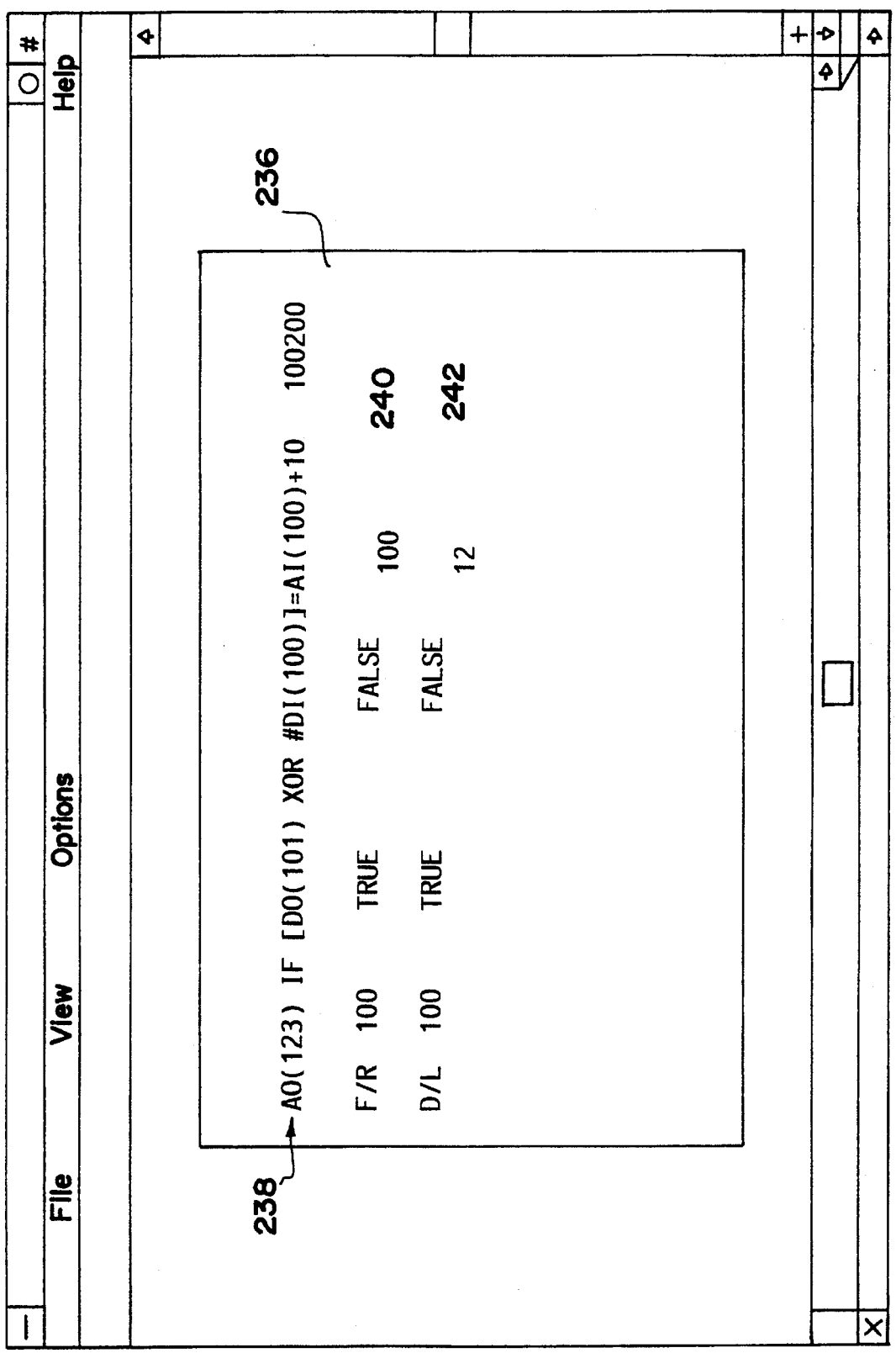
FIG. 7 is a similar display window to that of FIG. 6, showing the case where the redundant process control computers are not in agreement.

Implementing the display illustrated in FIGS. 6 and 7 is not just a simple matter of displaying numbers adjacent the source code listing. For maximum utility, the values displayed must be "time aligned" in two dimensions. First, all values displayed for a given process control computer should reflect actual values for the same clock cycle. In addition, the values displayed for each redundant process control computer should also be from the same clock cycle. In other words, referring to FIG. 6, the value of 100 reported for variable AO(123) for the fox should be the value obtained during the same time interval as the input variable AI(100) was obtained for the fox. This may be referred to as horizontal time alignment. In addition, the value obtained for analog output AO(123) for the fox should also be obtained during the same time interval as the corresponding analog output AO(123) for the dog. This may be referred to as vertical time alignment. The presently preferred embodiment implements a system having both horizontal and vertical time alignment.

In order to provide for horizontal time alignment several different approaches may be taken. Referring to FIGS. 1 and 2, the display window 236 may be generated for display at one or more of the workstations 28 or to any suitable display terminal connected to process information system 34. The actual data values displayed in the display window may be obtained from the process control computers by strobing the data into a memory storage location (e.g., in the workstation computer) at the appropriate time. With reference to FIG. 2, the data can be strobed into the operator workstation 28 via the intelligent front end 92.

There are several possibilities for providing vertical time alignment in the present system. Referring to FIG. 5A–5E, one possibility is to strobe the data at point P (FIG. 5C) after arbitration has completed. At this point in the cycle the analog and digital input variables have all been read and any adjustments during arbitration have been made. Once strobed into memory, these analog and digital input values are stored until the next clock cycle or at least until the processing interval 228 has ended. In this way, the system ensures that the analog and digital input variables and the analog and digital output variables are time aligned, i.e. they represent the state of the system during a single clock cycle.

Another way to accomplish horizontal time alignment is to fire the input data strobe after the processing interval has completed, as at point Q in FIG. 5D. By firing the strobe at point Q, the input data, read from the field units, and the output data, resulting from the processing interval 228, are from the same clock cycle. Yet another way of providing for horizontal time alignment is to fire the data acquisition strobe during the Hz∞ interval as at point R in FIG. 5E. Firing the strobe at this point also ensures that the input and output data are from the same clock cycle.

The system provides for vertical time alignment through the manner in which at least one of the redundant computers (the dog in the foregoing example) starts its clock cycle execution after its redundant counterpart (the fox in the foregoing example). Vertical time alignment is ensured because each of the redundant computers is responsible for reading the identical input data and, in most cases, for performing the same computational and processing steps. The presently preferred embodiment thus implements a loosely synchronized time alignment mechanism in which each process control computer has its own internal clock. In the alternative, it is possible to implement a system which relies on a single master clock shared by all process control computers. Such a system might be characterized as a tightly synchronized system, since the master clock would, in that case, be determining when each of the computers performs all of the required tasks. The loosely coupled synchronization technique is preferred, since it eliminates the need to rely on a single master clock which, if it were to fail, would halt the entire system. In the preferred loosely coupled synchronization scheme a failure in one of the computers' clocks would not halt the system, since the remaining redundant computer would still presumably be operative.

In the loosely coupled synchronization scheme the redundant computers are in communication with each other over the master link 60. Master link 60 has been illustrated by a dashed line in FIGS. 5A–5E. It is over this master link that the fox 220a tells the dog 220b that it has started a clock cycle, from which dog 220b is able to generate its start signal approximately 2 milliseconds thereafter. It is also over the major link 60 that the fox and dog arbitrate during the arbitration interval 226.

The presently preferred embodiment prepares the files needed for information display during compile time. This makes the information display system operate more quickly in use. Thus, the entire process control program is parsed, statement-by-statement, and an indexed file is constructed which contains not only a string describing the program statement to be displayed but also the physical location on the screen at which each of the variables associated with that statement must appear. Preferably, the individual program statements each are assigned a unique line number which is used as the key to look up the statement in a database comprising a string or alphanumeric representation of the program statement itself, and a list of all variables which must be accessed in connection with that program statement. The variable list is used not only to identify which variables must be accessed for real time display but also the physical location on the screen where those variables will appear. Preferably, a record of each variable is provided together with a list of all line numbers in which that variable appears. Thus the data may be readily accessed by either direct entry of a line number or by requesting a search of all line numbers in which the desired variable appears. In either case, the line number is used as the key by which the desired information is looked up.

The Preferred Programming Language

In the presently preferred programming system, a program statement or expression is used to instruct the process control computer to perform a specific activity. The result of the specified activity may be internal to the process control computer, such as changing a value in memory, or external, such as activating an alarm, displaying a message or changing a valve position. Typically a complete process control program will include a plurality of such program statements. Each program statement consists of a string of alphanumeric characters in one or more lines. More specifically, the alphanumeric characters are grouped into sequences called tokens. The tokens are the basic lexical units of the language. In other words, the token is the smallest language unit which conveys meaning. Some examples of tokens include keywords such as the keyword IF; variable names such as DI(101) and AO(112); constant names such as AK(100) and DK(101); variable names such as AC(12) and DC(22); operators such as LT(<); and punctuation such as ().

Each program statement in the presently preferred language represents a single value or causes a specific result to occur. For example, the calculation of a variable, a TRUE/FALSE digital value, a print message and an alarm are all results which have unique values as determined by a program statement. Each program statement or expression itself can be broken down into a left-hand side (sometimes called the L value or LVAL) and a right-hand side (sometimes called the R value or RVAL), with an "equivalence token" separating the two. The left-hand side represents the "resultant" of the program statement. The right-hand side may contain operators (such as +, −, OR, AND, XOR, <,>, etc.) and operands (such as variables or constants) which determine the state of the resultant. Most expressions may be classified basically as arithmetic, comparative or logical. Combinations of these can also occur in a single program statement.

Figure 8:
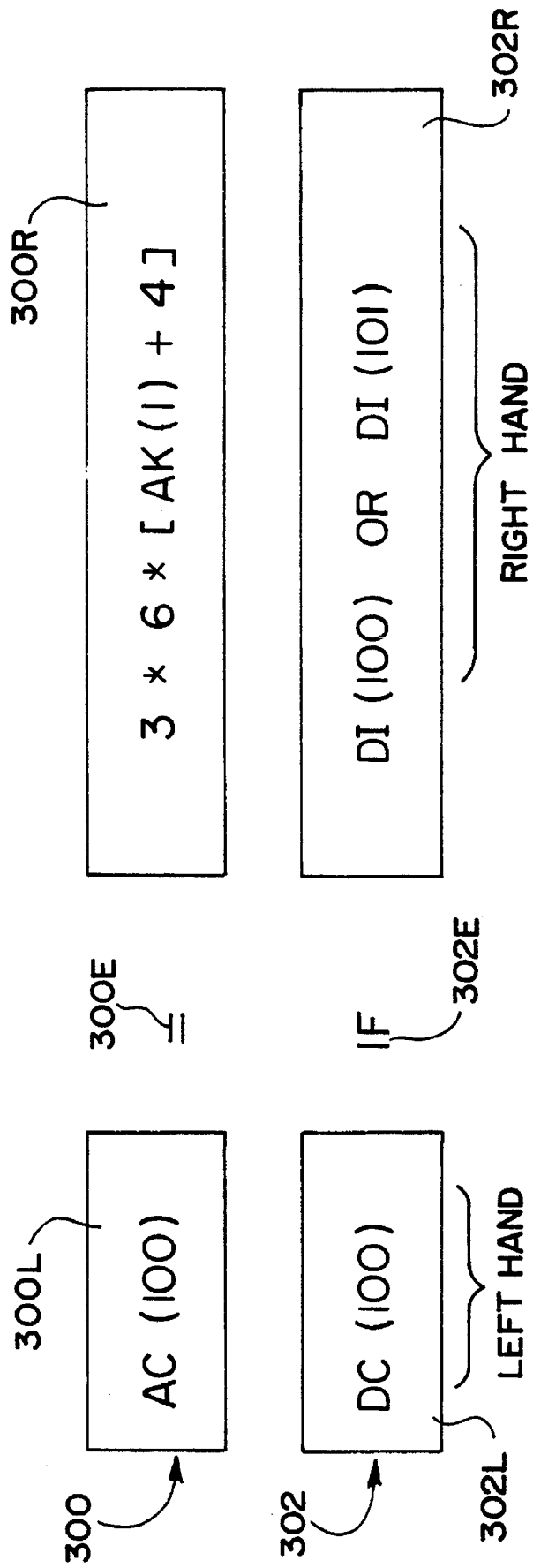
FIG. 8 depicts the component parts of a program statement in accordance with the invention, showing both an arithmetic expression and a logical expression.

FIG. 8 depicts the component parts of a program statement. In FIG. 8 two program statements or expressions are illustrated, an arithmetic expression at 300 and a logical expression at 302. Separating the left-hand and right-hand sides 300L and 300R of the arithmetic expression is the "is defined as" or "goes to" equal sign ("=") equivalence token 300E. Separating the left-hand and right-hand sides 302L and 302R of the logical expression 302 is the conditional "goes to," IF equivalence token 302E. Also shown in FIG. 8 are two actual expressions written in alphanumeric characters. Specifically, the arithmetic expression 300 used in this example is:

$$AC(100)=3\times 6\times [AK(1)+4].$$

The logical expression 302 used in this example is:

$$DC(100) \text{ IF } DI(100) \text{ OR } DI(101).$$

Unlike conventional programming languages which assign precedence to difference classes of arithmetic operators (multiplication and division are done before addition and subtraction), evaluation of arithmetic expressions in the present language is accomplished by working left to right, evaluating pairs of terms using whatever arithmetic operator occurs between the pairs. As each pair is evaluated, the result becomes the first term of a pair along with the next term in the expression. If one of the terms is in brackets, the bracketed term is evaluated first in the same left to right order within the brackets.

Figure 9:
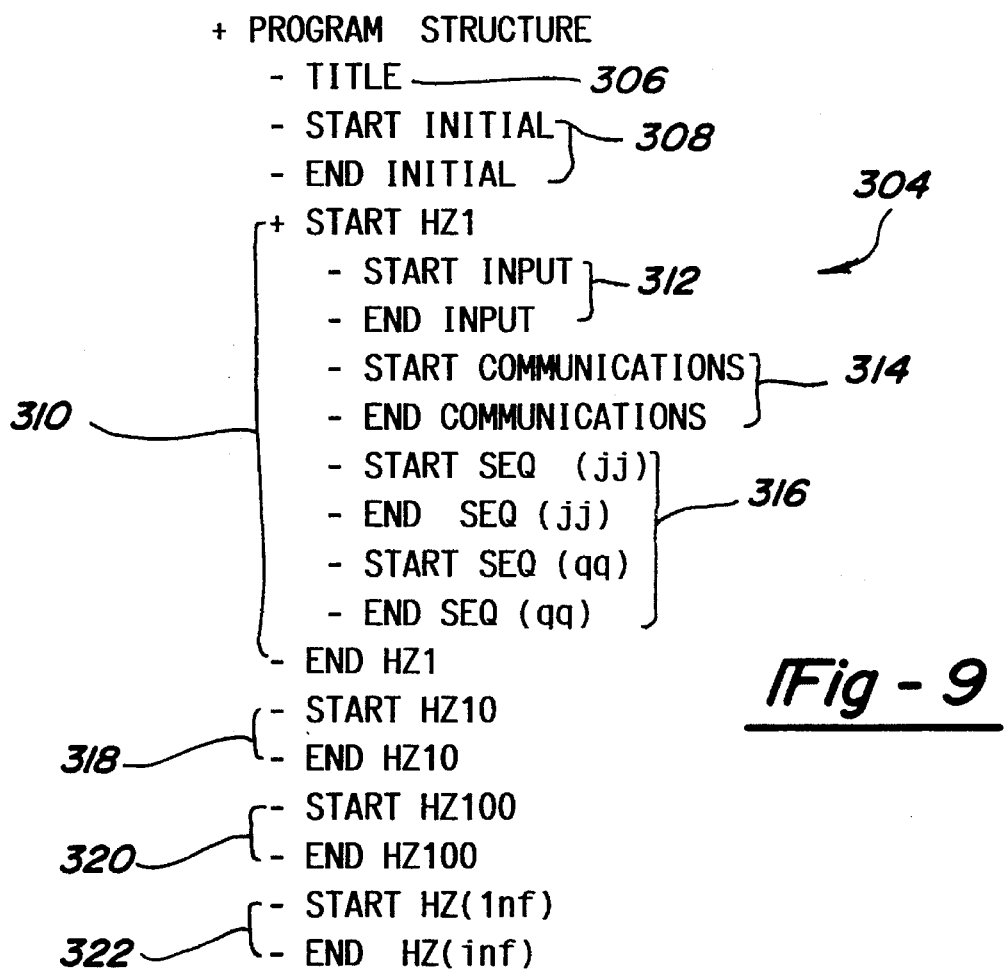
FIG. 9 is an example listing showing the basic program structure of the presently preferred, embodiment.

It will be recalled from the discussion of FIG. 4 that the presently preferred process control computer executes once each second all program statements which comprise that computer's assigned process control tasks. The presently preferred programming language is structured to integrate with that once-per-second cycle. Referring to FIG. 9, the presently preferred program structure is illustrated at 304.

The program structure includes a header section designated Title 306 in which the title, author and pertinent version control information can be placed. Next follows the initialization section 308 into which the appropriate system initializing parameters are placed. These might include, for example, the CPU identification defined for the system, the number of redundant process control computers which comprise the system, a declaration of any analog constants and their associated scale factors, the identity of and definition of all recipes used in the system, including the number of recipes and components as well as all values and scale factors, and so forth.

Following the initialization section is the 1 cycle per second program statement section 310 also referred to as HZ1. It is this 1 Hertz section that is referenced in the 1 Hertz cycle illustrated in FIG. 4. The 1 Hertz section 310 includes a data input section 312 which is associated with some aspects of data collection in to the time interval 224 in FIG. 4. The program structure also includes a communications section 314 which is associated with communications performed in time intervals 226 and 232. The 1 Hertz section includes the sequence portion 316 in which the actual process control steps are set forth as a collection of separately identified, sequentially performable sequences. The use of sequences in the preferred embodiment is discussed more fully below.

The end of the sequence section 316 also marks the end of the 1 Hertz section 310. It will be recalled that the 1 Hertz (1 cycle per second) time interval is used in the presently preferred embodiment, since most processes under control react slowly enough that adequate control is maintained with a 1 cycle per second control interval. To accommodate tasks which need to be monitored or controlled more frequently than once per second, the invention implements a 10 times per second or 10 Hertz time interval, and a 100 times per second or 100 Hertz interval which interrupt the 1 Hertz and Hz∞ time intervals to facilitate high speed functionality. In the program structure 304 sections are reserved for the 10 Hertz and 100 Hertz control information. These are designated HZ10 and HZ100 and also by reference numerals 318 and 320, respectively. Finally, any time remaining which is not used by the process control steps is reserved for the Hz∞ time interval 232 of FIG. 4. The program structure 304 includes a space for listing any Hz∞ operations at 322.

As noted above, the program structure contemplates breaking a process control problem down into a series of sequences. In FIG. 9, for example, two sequences SEQ(jj) and SEQ(qq) were illustrated. The use of sequences can make the process control program easier to read and easier to manage and maintain. The decision on how to break up a process control problem into sequences is made by the process control engineer responsible for writing the program. The following general guidelines may be applied when a process control task is being divided into sequences:

(1) break points between sequences are typically pipelines or "surge points" in the process;

(2) unit operation, like a distillation column and its associated equipment (reboilers, overhead condenser, pumps, etc.) is usually designated as one sequence;

(3) a single sequence cannot be spread across more than one process control computer; it utilizes a portion of the capacity of a single process control computer; and (4) single sequences can be used to represent raw materials and intermediate or final product storage tanks.

After a process has been subdivided into sequences, each sequence can be further broken down into smaller segments of operation called steps. Each step within a sequence indicates a particular function of the process under control. Each step describes what is happening in the given sequence. Specific process events preferably determine the beginning and end of each step. When the events which characterize a step are completed, the sequence status changes by moving to another step. Thus steps can be used to coordinate nearly all control actions and alarms for a given process.

The presently preferred embodiment uses unique step numbers to differentiate one step from another. For example, the presently preferred embodiment has 1,000 steps available for use in the system. Steps are assigned uniquely for each sequence without overlap. Thus, if sequence 2 contains steps 200 through 215, sequence 3 could start with step 216 and would contain none of the step numbers assigned to sequence 2.

Sequence numbering and step numbering enable the programmer to uniquely identify a particular range of program statements or expressions. As illustrated in the memory map diagram of FIG. 3, the specific storage location and identifiers for all available steps and all available sequences are predefined by the process control computer architecture. Being preassigned, all redundant process control computers in a system are able to make reference to the same sequence number and step number (during arbitration, for example) without ambiguity. This offers a considerable advantage in terms of speed and reliability. The preallocated numbering scheme ensures that all process control computers can reference a sequence number or step number without the need to perform intermediary look-up operations. The approach is also highly reliable since there is not ambiguity from one process control computer to another. In other words, sequence 2, step 202 refers to precisely the same sequence and step, regardless of which process control computer is making reference to it.

Advisory System

To add further versatility to the information display system, an intelligent advisory system is provided. This advisory system works in conjunction with the program statement display. More specifically, the advisory system is implemented in a window such as window 352. The advisory window provides a textual representation of all possible states of the displayed digital variables [e.g. DI(100)], Boolean expressions [e.g. AI(100)>AI(200)] and Boolean functions [e.g. functions to perform deviations or to time delayed events] that could make the Boolean portion of the program statement TRUE. This information is used to advise the system operator of ways to manipulate the variables referenced in a selected statement, in order to force the logical portion of the statement to evaluate to a TRUE state. The analysis that the application performs and the resulting advice is based on a snapshot of the live data obtained using the above-described time aligned data access mechanism.

Figure 10:
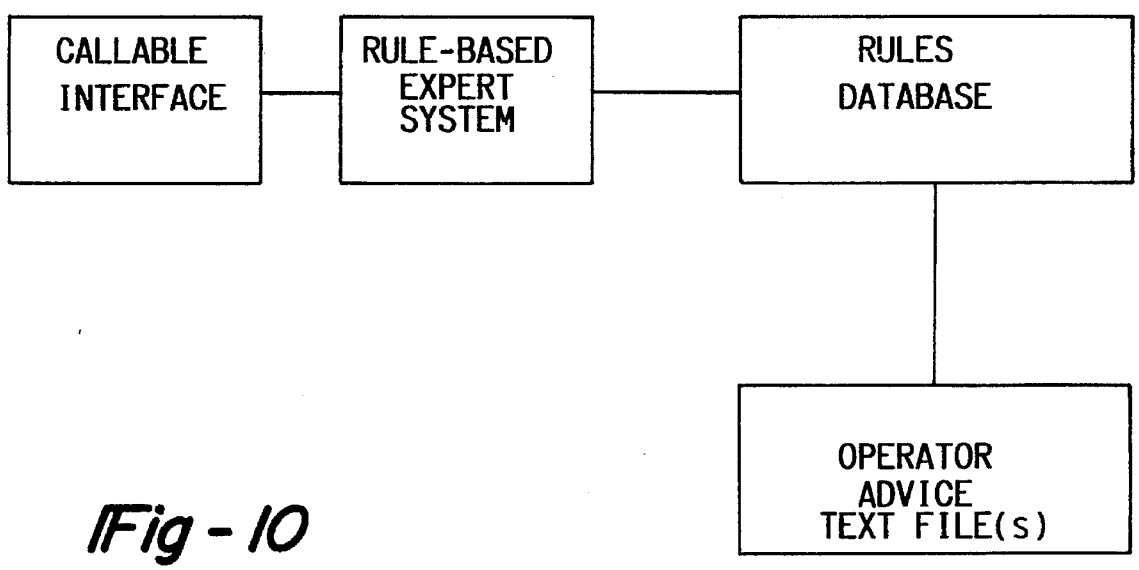
FIG. 10 depicts the presently preferred configuration for performing the advisory system function of the invention.

The advisory system as shown in FIG. 10 may employ an expert system having a callable interface and an associated collection of "operator advice" text for display upon identification of a situation.

Self-Evaluation System

The presently preferred system includes a self-evaluation option which is used to assist the operator with the interpretation of program statements. This option can be enabled by moving the cursor to a self-evaluation check box and clicking a mouse button. After the self-evaluation option is enabled in this fashion, all program statements shown in the main window will have the self-evaluation operation performed.

Self-evaluation causes the display of two types of indicators for all program statements that contain Boolean expressions. In the presently preferred embodiment these indicators include showing values which are currently TRUE in reverse video and by further showing how far truth has progressed through the statement using underlining.

The following rules are employed to determine how to indicate what is currently TRUE.

(1) all variables that have a digital format and which have a value of TRUE are displayed in reverse video format.

(2) The NOT operand is displayed in reverse video format if it occurs before a variable or expression and if the variable or expression is FALSE.

(3) Brackets in a program statement that contain a TRUE expression are displayed in reverse video format.

(4) Any functions (e.g. AI[100]>AI[200]) that are TRUE will be displayed in reverse video format.

An example of how these rules are applied is shown in FIG. 11. In FIG. 11 the reverse video format is depicted as a box. In this regard, other visual attributes may be used, e.g., color change, color shading change, etc.

In determining how far a statement is TRUE, i.e. how far truth has progressed through the program statement, the following rules are applied.

(1) Only Boolean variables, functions and Boolean expressions are evaluated.

(2) Underlining starts from left to right.

(3) Bracketed expressions are underlined only if the entire expression is TRUE.

(4) Non-Boolean variables and expressions are not underlined.

An example of how these rules are applied is shown in FIG. 12.

Watch Window

Figure 13:
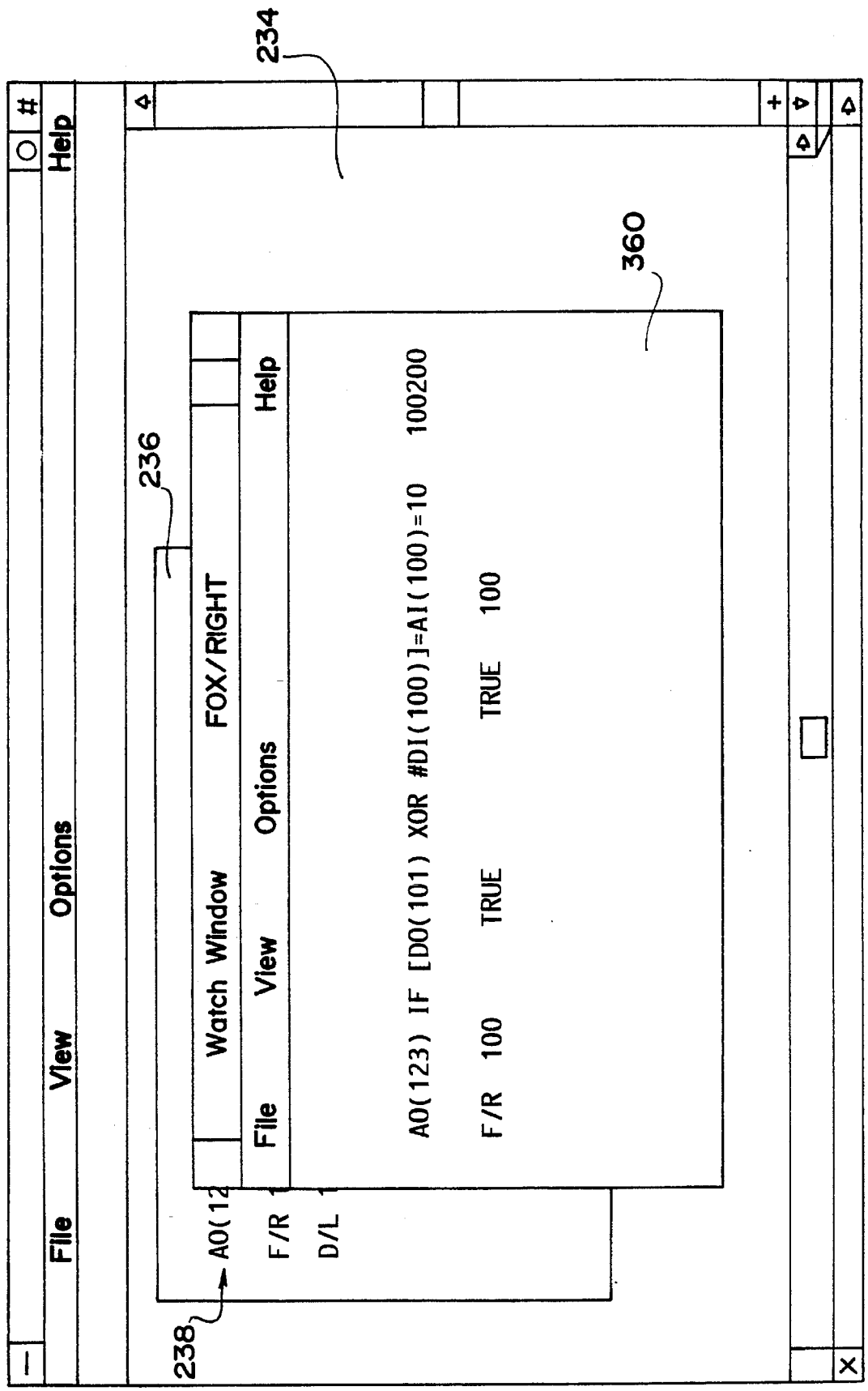
FIG. 13 depicts the watch window of the present invention.

The information display system includes a watch window which allows the operator to select a subset of the program statements that are currently displayed on the main window and have them displayed in a separate window called the watch window. This capability allows the operator to reconfigure the main window, to examine other items of interest, while maintaining a view of important program statements that were displayed in the original main window. As illustrated in FIG. 13, the watch window 360 is related to the main window 234. If desired, the watch window can be implemented as a child window of the main window. If the main window is iconized or deleted, the associated watch window will also be iconized or deleted. The watch window further provides a way for the operator to access the advice for TRUE function described above. If desired, there can be several watch windows associated with a single main window.

Live Data Access

As described above, the information display system collects live data from the redundant process control computers at a preselected time during the loosely synchronized program cycle. This may be implemented in a number of ways. However, the presently preferred embodiment utilizes the circuitry of the intelligent front end 92 (FIG. 2) for storing the values from each of the redundant process control computers for later access by the operator station 28 or process information system 34. To reduce the memory requirement, live data is collected from the process control computers only on an as-needed basis. For example, if a single program statement being displayed utilizes only three variables, then only those three variables are collected from the redundant process control computers. The presently preferred embodiment implements this by sending data request messages via the intelligent front end 92 which correspond to the variables contained in the program statement displayed in the main window (and also in any child windows or watch windows). As long as the program statement being displayed is unchanged, these data are updated each cycle and ultimately displayed beneath their alphanumeric designation in the main window. If a different program statement is selected by the operator, requiring new variables to be fetched, additional data request messages are sent via the intelligent front end 92. The presently preferred embodiment synchronously sends and receives data request messages. This is preferred over asynchronous data requests since synchronous messaging does not require keeping track individually of each message sent and watching for the return of all of them before redisplaying the data.

To further improve the system performance and reduce the memory overhead requirements, the live data refresh system may be automatically disabled when windows are reduced to an icon or when they are occluded by other windows. Preferably, the incoming data is buffered using a buffering system which automatically rebuilds the buffer upon reselection of the program statement.

Information Model and Functional Components

Figure 14:
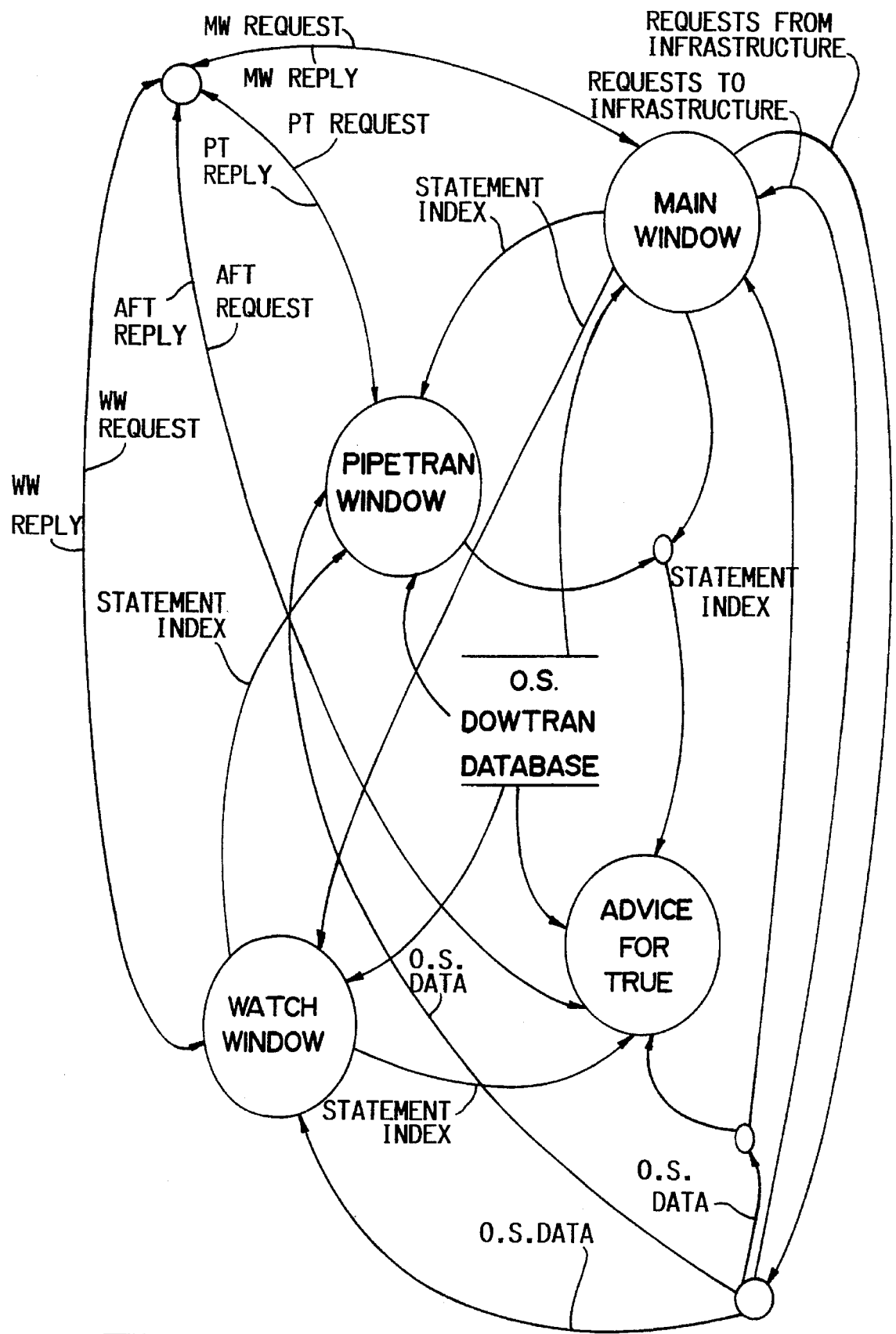
FIG. 14 illustrates the functional components of the presently preferred implementation.

Referring to FIG. 14 the functional components of the present implementation are illustrated. As shown, the main window provides access to various options that allow the user to present information in different formats and to access other components of the invention such as the advice for TRUE component. Preferably, the main window component is crafted to provide a mechanism for operators to access the illustrated options in the same way that other operator station features are accessed. In this way, a consistent interface is presented, making it easier for the user to work with the system intuitively. In the illustration of FIG. 14, the graphical display window can optionally provide a graphical rendering of a program statement resembling an interconnection of pipes and valves to give the operator a concrete illustration of the flow of truth through the program statement.

Figure 15:
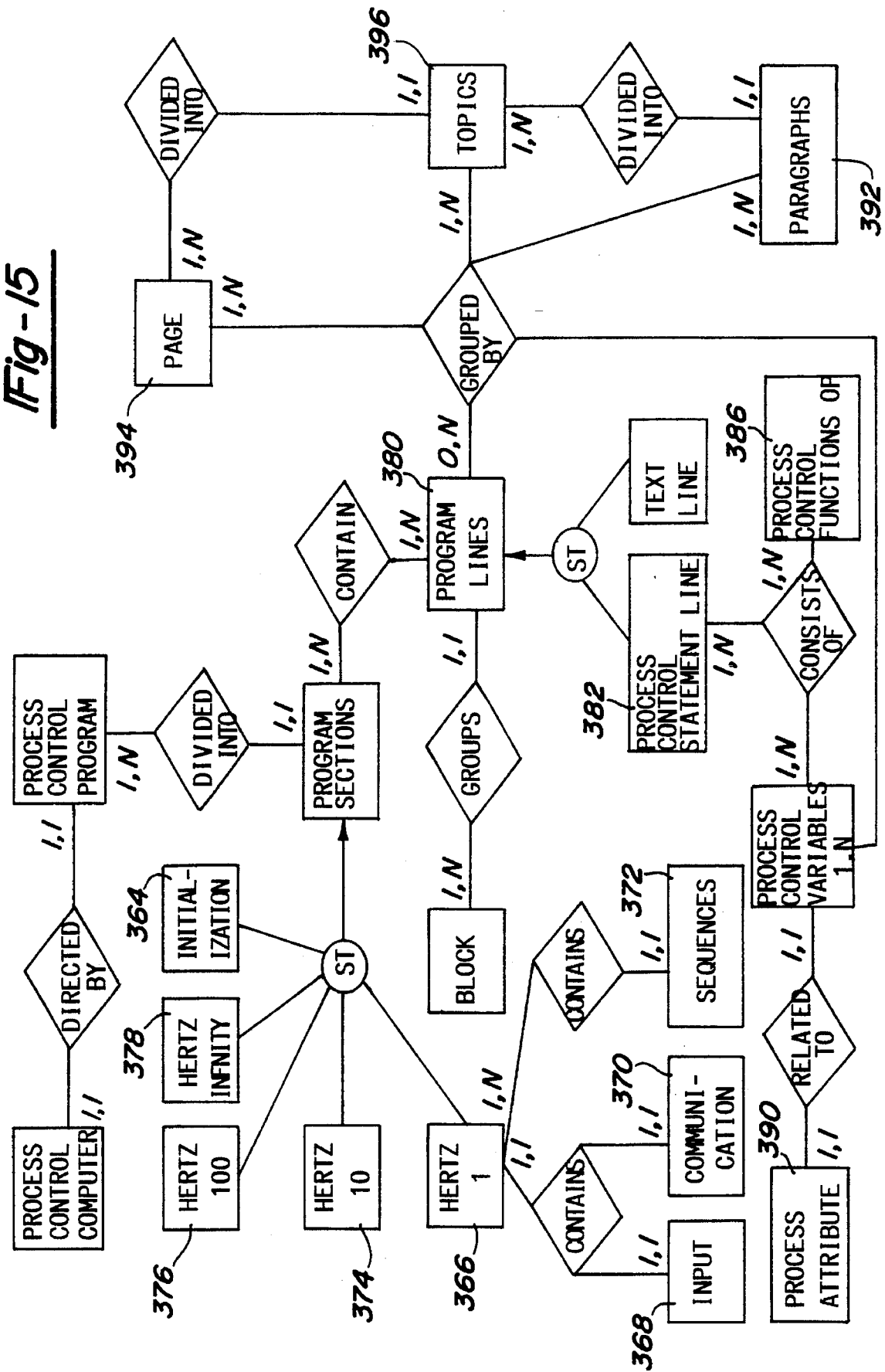
FIG. 15 depicts the information model of the presently preferred embodiment.

Referring now to FIG. 15, the information model of the presently preferred embodiment is illustrated. It will be seen that this information model corresponds to the program structure described in FIG. 9. The initialization section 364 contains the program code required to initialize the process control computer variables and peripherals such as printers, records and the like. The initialization section 364 does not ordinarily contain any executable code. The 1 Hertz section 366 references all program code that must be executed at least once per second. As explained above, this is ordinarily the place where all process control statements are placed. The 1 Hertz section includes input section 368 which contains references for the program code that performs data acquisition and related preprocessing, such as reading analog and digital inputs, performing digital filtering and scaling analog values. The 1 Hertz section also has a communications section 370 which contains references for the program code necessary to implement communication between the redundant process control computers. The 1 Hertz section also includes a sequence section 372. There is one sequence section for each active sequence, with each sequence section containing references for the program code for that specific sequence. The present implementation allows a maximum of 99 sequences which may be controlled by a single program.

In addition to the 1 Hertz section, the present implementation also includes a 10 Hertz section 374 and a 100 Hertz section 376. The 10 Hertz section is used to contain references for program code that must be executed at least 10 times per second, while the 100 Hertz section contains references for program code that must be executed at least 100 times per second. Finally, the implementation includes the Hz∞ section 378. This section contains references for program code that must be executed as often as possible. As previously explained, the Hz∞ section utilizes whatever time remains after the 1 Hertz, 10 Hertz and 100 Hertz sections have completed their operations.

With continued reference to FIG. 15, it is seen that the program sections previously described each contain or comprise one or more program lines, depicted diagrammatically by block 380. Program lines can be in the form of process control program statement lines 382 or text lines 384. A program statement 382 comprises an element of a process control program. It is used to instruct the process control computer to perform a specific activity. Text lines serve as documentation and are not used by the program in any way. Text lines are identified by placing a comment character "C" at a predefined location to designate that line as a text line. As illustrated, program statement lines are made up of operators and functions, depicted by block 386 and also of variables depicted by block 388. The present implementation provides a full complement of arithmetic and Boolean operators as well as functions for performing specific process control tasks. Naturally, the complement of functions offered by a given implementation can be made to match the types of physical operations being controlled in the plant.

The variables which make up the program statement line comprise data structures that are all predefined and preassigned to explicit memory locations within the computer architecture. These variables may also have attributes which provide additional information about the state of a process control condition as expressed by the variable. For example, digital inputs may have an attribute of manual/automatic, which indicates whether the operator has placed a particular variable (and thus the equipment that it controls) in automatic control by the process control program. In FIG. 15, these attributes are depicted generally at 390.

Although the particular arrangement of program statements into a process control program can vary depending on the implementation, the presently preferred embodiment groups program lines into paragraphs 392, pages 394 and topics 396, as illustrated.

From the foregoing it will be seen that the present invention provides an information display system and a tightly integrated programming environment which is ideally suited to process control applications. Redundant process control, including active redundant control is accommodated. The system is designed to provide the operator with up-to-date, meaningful information in a form which can be quickly and easily grasped. The information display system is therefore very useful in debugging process control programs, troubleshooting intermittent and faulty systems, and simply understanding how the process is actually being controlled. Moreover, the time aligned live data values, presented for each of the redundant process control computers simultaneously, greatly facilitates the transition from one software version to another.

While the invention has been illustrated and described in its presently preferred form, it will be understood that the invention can be adapted to a variety of different programming environments and to a variety of different computer controlled applications without departing from the spirit of the invention as set forth in the appended claims.

What is claimed is:

1. A computerized process control display system for conveying information to an operator about the state of a process under control, comprising:

first and second independently and concurrently operating redundant process control computers each having interface means for connection to a common point within the process under control and for concurrently monitoring a common parameter associated with said common point;

first and second process control programs running respectively on said first and second process control computers, the programs each having means for controlling the behavior of at least a portion of the process under control, said process control programs being capable of representation as a series of source statements wherein said source statements include at least one token to represent said common parameter;

a display computer coupled to said first and second process control computers for displaying at least a portion of said series of source statements comprising said process control programs;

said display computer further having data access and display means for obtaining and simultaneously displaying the common parameter value adjacent its token in said source statement from both first and second process control computers, whereby the operator is provided a means to simultaneously visually compare the common parameter values from said first and second process control computers.

2. The system of claim 1 wherein said first and second process control programs are substantially redundant.

3. The system of claim 1 wherein said first and second process control programs are substantially identical.

4. The system of claim 1 wherein said process control computers are actively redundant.

5. The system of claim 1 wherein said first and second process control computers are synchronized with respect to a common relative clock cycle.

6. The system of claim 1 wherein said first and second process control computers are synchronized with respect to a common relative clock cycle and wherein said data access and display means provides vertical time alignment of said common parameter by obtaining the common parameter from each of said process control computers during the same relative clock cycle.

7. The system of claim 1 wherein said first and second process control computers each have a means for defining a clock cycle and wherein said process control computers fully execute said process control programs during a single clock cycle.

8. The system of claim 7 wherein said clock cycles of said first and second process control computers are synchronized.

9. The system of claim 7 wherein said first and second process control computers are coupled to one another for communication and wherein said first and second process control computers communicate with one another to synchronize said clock cycles.

10. The system of claim 7 wherein said first and second process control computers are coupled together for communication and wherein said clock cycle includes a time interval during which said first and second process control computers arbitrate.

11. The system of claim 7 wherein said clock cycle includes a predetermined time interval during which said common monitored parameter value is obtained.

12. The system of claim 7 wherein said process control computers each provide an output signal to said common point and wherein clock cycle includes a predetermined time interval during which said output signal is provided.

13. The system of claim 1 wherein said first and second process control computers each have further interface means for connection to a second common point within the process under control and for monitoring a second common parameter associated with said second common point.

14. The system of claim 13 wherein said series of source statements include at least one token to represent said second common parameter; and wherein said display computer further having data access and display means for obtaining and simultaneously displaying the second common parameter value adjacent its token in said source statement from both first and second process control computers, whereby the operator is provided a means to simultaneously visually compare the common parameter values and the second parameter values from said first and second process control computers.

15. The system of claim 14 wherein said first and second process control computers are synchronized with respect to a common relative clock cycle and wherein said data access and display means provides horizontal time alignment of said common parameters and said second parameters by obtaining the common parameters and the second parameters from each of said process control computers during the same relative clock cycle.

16. A computerized process control display method for conveying information to an operator about the state of a process under control of a plurality of concurrently operating redundant process control computers, comprising the steps of:

using a plurality of textually represented program statements to represent at least a portion of a process control strategy being used to control said process;

said program statements comprising a plurality of tokens representing control parameters associated with the process under control;

automatically obtaining data substantially simultaneously from each of said concurrently operating process control computers and using said data to assign to said tokens an actual state for at least a portion of said control parameter tokens.

17. The method of claim 16 further comprising displaying said actual states of said portion of said control parameters.

18. The method of claim 16 further comprising using said process control computers to process substantially redundant program statements.

19. The method of claim 16 further comprising using said process control computers to process substantially identical program statements.

20. The method of claim 16 further comprising synchronizing said process control computers with respect to a common relative clock cycle.

21. The method of claim 16 further comprising synchronizing said process control computers with respect to a common relative clock cycle and wherein said step of automatically obtaining data is performed to achieve vertical time alignment by obtaining data from each of said process control computers during the same relative clock cycle.

22. The method of claim 16 said process control computers each define a clock cycle and wherein each computer processes all of the program statements representing said portion of said process control strategy completely during a single clock cycle.

23. The method of claim 16 further comprising establishing communication between said process control computers and using said communication to synchronize said process control computers to a common relative clock cycle.

24. The method of claim 16 further comprising synchronizing said process control computers with respect to a common relative clock cycle and wherein said step of automatically obtaining data is performed to achieve horizontal time alignment by obtaining data for a plurality of different tokens from each of said process control computers during the same relative clock cycle.

25. The method of claim 16 wherein each of said process control computers establishes a clock cycle during which the process control strategy is fully executed.

26. The method of claim 25 wherein said clock cycle includes a predefined time interval during which data is automatically obtained.

27. The method of claim 25 wherein said process control computers provide at least one output signal and wherein said signal is issued during a predefined time interval within said clock cycle.

28. A computerized process control display system for conveying information to an operator about the state of a process under control, comprising the steps of:

using at least one textually represented program statement to represent at least a portion of a process control strategy being used to control said process;

said program statement comprising a plurality of tokens including at least one L-value token and at least one R-value token each having a Boolean portion;

automatically obtaining data from said process being controlled and using said data to assign to said R-value tokens an actual Boolean state for each of said tokens;

displaying said textually represented program statement using a first visually distinguishable display attribute to depict tokens which are currently TRUE and using a second visually distinguishable display attribute to depict tokens which are currently FALSE, whereby information about the state of the process control strategy is conveyed to the operator.

29. A computerized process control display system for conveying information to an operator about the state of a process under control, comprising the steps of:

using a plurality of textually represented program statements to represent at least a portion of a process control strategy being used to control said process;

said program statements comprising a plurality of tokens representing control parameters associated with the process under control;

automatically obtaining data from said process being controlled and using said data to assign to said tokens an actual state for each of said tokens;

establishing a main display window and a watch window associated with said main display window for display of textually represented information;

selecting a first subset of said plurality of textually represented program statements and displaying said first subset in said watch window;

without changing the first subset selected, selecting a second subset of said plurality of textually represented program statements and displaying said second subset in said main window;

wherein the steps of displaying said first subset in said watch window and displaying said second subset in said main window are performed independently such that the selection of said first subset is unchanged by a change in selection of said second subset, whereby information about the state of the first and second subsets are independently and simultaneously conveyed to the operator.

* * * * *